US012200344B2

(12) United States Patent
Fornasiero et al.

(10) Patent No.: US 12,200,344 B2
(45) Date of Patent: Jan. 14, 2025

(54) PROCESS AND SYSTEM FOR IMAGE EVALUATION USING A CAMERA, A GROUP OF TRANSMITTERS AND A RECEIVER

(71) Applicant: Dräger Safety AG & Co. KGaA, Lübeck (DE)

(72) Inventors: Livio Fornasiero, Lübeck (DE); Folke Will, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 125 days.

(21) Appl. No.: 18/176,596

(22) Filed: Mar. 1, 2023

(65) Prior Publication Data
US 2023/0283880 A1 Sep. 7, 2023

(30) Foreign Application Priority Data
Mar. 2, 2022 (DE) ...................... 10 2022 104 864.0

(51) Int. Cl.
*H04N 23/611* (2023.01)
*G01S 3/04* (2006.01)
(Continued)

(52) U.S. Cl.
CPC ............ *H04N 23/611* (2023.01); *G01S 3/043* (2013.01); *G01S 3/14* (2013.01); *H04N 23/10* (2023.01)

(58) Field of Classification Search
CPC ... G01S 3/043; G01S 3/14; G01S 3/02; G01S 1/08; G01S 1/12; G01S 2205/09;
(Continued)

(56) References Cited

U.S. PATENT DOCUMENTS

| | | | |
|---|---|---|---|
| 7,557,825 B2 * | 7/2009 | Ishii ..................... | H04N 23/611 |
| | | | 348/211.3 |
| 2006/0066723 A1 * | 3/2006 | Iwase ................... | H04N 23/662 |
| | | | 348/E7.086 |

(Continued)

FOREIGN PATENT DOCUMENTS

| DE | 102013201769 A1 | 8/2014 |
|---|---|---|
| EP | 2890953 B1 | 5/2021 |

(Continued)

OTHER PUBLICATIONS

J Kemper, H. Linde: "Challenges of Passive Infrared Indoor Localization", Proceed. 5th Workshop on Positioning, Navigation and Communication, pp. 63-70, 2008.
J. Shi & C. Tomasi: "Good Features to Track", IEEE 19/94, pp. 1063-1069.
(Continued)

*Primary Examiner* — Nathnael Aynalem
(74) *Attorney, Agent, or Firm* — McGlew and Tuttle, P.C.

(57) ABSTRACT

A process and an image evaluation system are provided with a mobile sensor arrangement, including a camera (IR), a motion sensor (IMU), and a receiver (Komm), that is moved through a spatial area. The camera generates an image sequence. The motion sensor generates an orientation signal with camera viewing direction in a predefined three-dimensional coordinate system when generating an image. A signal processing unit (Sv) checks whether the receiver is receiving a signal from a transmitter (UWB.1, UWB.2, UWB.3) of a transmitter group. If the receiver receives a signal, the signal processing unit determines the distance between the transmitter and the receiver. A classifier (Kl) searches for images of humans in images of the image sequence. The signal processing unit decides whether an image of a human shows a person associated with a transmitter of the transmitter group and may generate a trajectory describing the movement of the camera.

19 Claims, 13 Drawing Sheets

(51) Int. Cl.
*G01S 3/14* (2006.01)
*H04N 23/10* (2023.01)

(58) Field of Classification Search
CPC ........ G06V 20/58; H04N 23/10; H04N 23/20;
H04N 23/611; H04N 23/90; G06T
2207/30244; G06T 2207/30196; G06T
2207/30201
USPC .......................................... 348/169; 382/103
See application file for complete search history.

(56) References Cited

U.S. PATENT DOCUMENTS

| | | | |
|---|---|---|---|
| 2015/0094883 A1 | 4/2015 | Peeters et al. | |
| 2021/0389152 A1 | 12/2021 | Beaurepaire | |
| 2023/0162533 A1* | 5/2023 | Matsuzawa | G01P 15/18 |
| | | | 382/115 |

FOREIGN PATENT DOCUMENTS

| | | |
|---|---|---|
| JP | 2020188326 A | 11/2020 |
| WO | 2007103674 A2 | 9/2007 |
| WO | 2014035257 A1 | 3/2014 |

OTHER PUBLICATIONS

E. Mair, G.-D. Hager, D. Burschka, M. Suppa & G. Hirzinger: "Adaptive and generic corner detection based on the accelerated segment test", European Conf. on Computer Vision, Sep. 2010, pp. 183-196, Springer.

T. Qin, P. Li & S. Shen: "Vins-mono: A robust and versatile monocular visual-inertial state estimator", IEEE Transactions on Robotics, 34(4), 2018, pp. 1004-1020.

G. Grisetti, R. Kummerle, C. Stachniss & W. Burgard, "A Tutorial on Graph-Based SLAM," IEEE Intell. Transp. Syst. Mag. 2(4), pp. 31-43, 2010.

F. Meyer: "Color image segmentation", Proceed. International Conference on Image Processing and its Applications, pp. 303-306, IET, 1992.

* cited by examiner

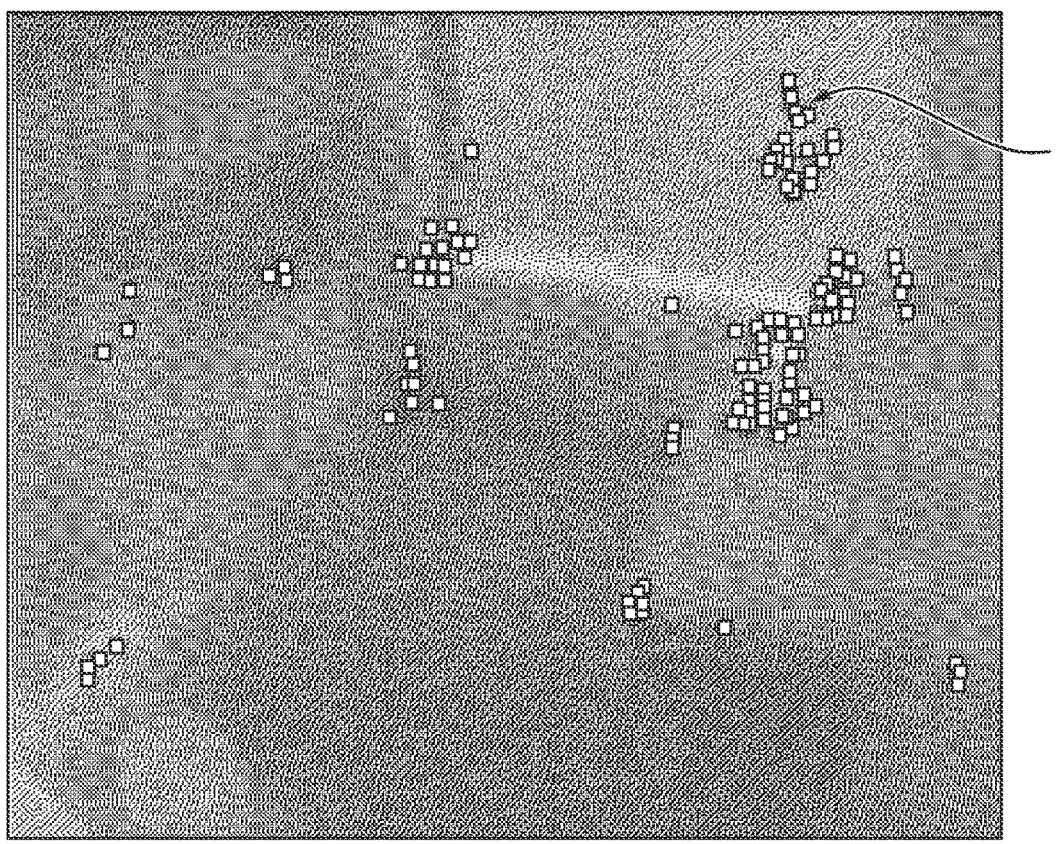
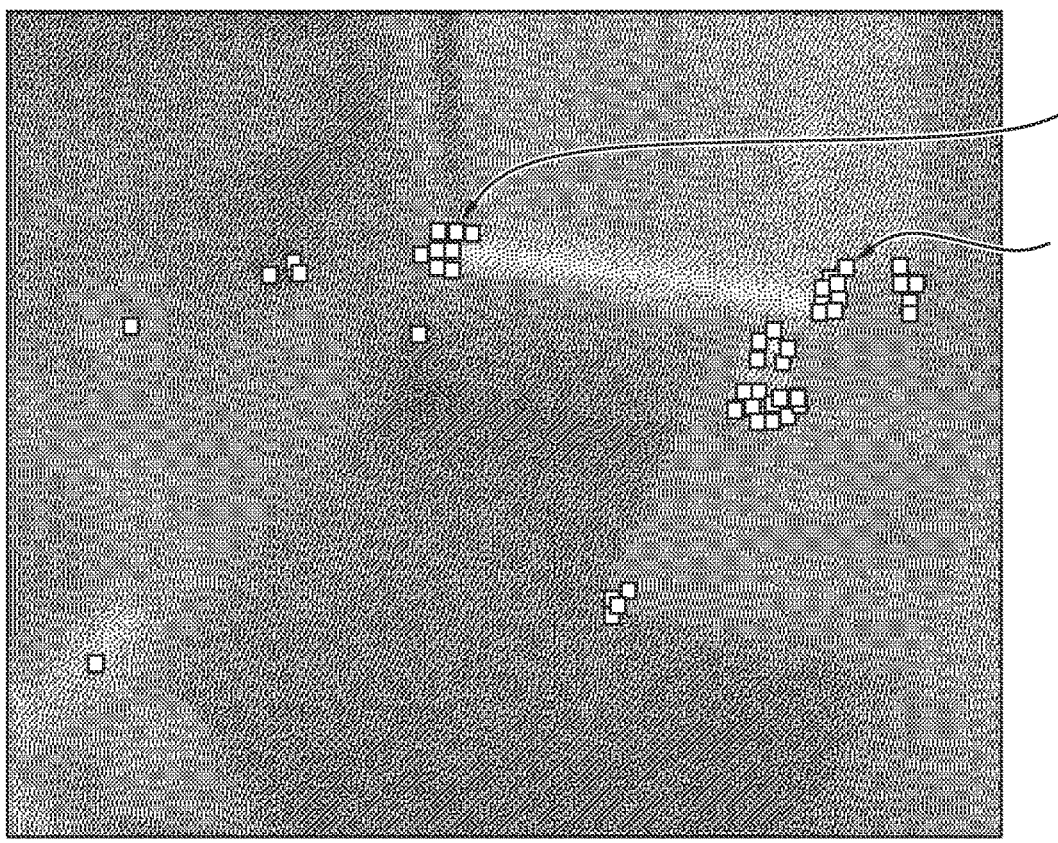
FIG. 7

PROCESS AND SYSTEM FOR IMAGE EVALUATION USING A CAMERA, A GROUP OF TRANSMITTERS AND A RECEIVER

CROSS REFERENCE TO RELATED APPLICATIONS

This application claims the benefit of priority under 35 U.S.C. § 119 of German Application 10 2022 104 864.0, filed Mar. 2, 2022, the entire contents of which are incorporated herein by reference.

TECHNICAL FIELD

The invention relates to a process and a system for image evaluation using a camera, a group of transmitters and a receiver.

BACKGROUND

The invention can be applied, for example, when firefighters enter a building or other spatial area which is or can be smoky or smoke filled. There may be humans in this area who need to be rescued or at least recovered. At least one firefighter carries a camera. Thanks to the invention, pictures of other firefighters can be more easily distinguished from images of other humans or objects in the images from the camera. The term "picture" denotes that part of an image of the camera which shows fully or at least partially a person of the group of persons or another human.

In J. Kemper, H. Linde: "Challenges of Passive Infrared Indoor Localization", Proceed. $5^{th}$ Workshop on Positioning, Navigation and Communication, pp. 63-70, 2008, different processes are described to locate humans in a building.

SUMMARY

An object of the invention is to provide a process and a system for image evaluation which are capable of identifying pictures of persons belonging to a group of persons and distinguishing them from pictures of other humans and objects with greater reliability than known processes and systems for image evaluation in images of a camera.

The object is attained by an image evaluation process having features according to the invention and by an image evaluation system having features according to the invention. Advantageous embodiments of the image evaluation process according to the invention are, as far as useful, also advantageous embodiments of the image evaluation system according to the invention and vice versa.

The image evaluation system according to the invention comprises
  a mobile sensor arrangement,
  a signal processing unit comprising a data-processing classifier, and
  a transmitter group.

The image evaluation process according to the invention is carried out using such an image evaluation system.

The mobile sensor arrangement includes
  a camera,
  a motion sensor and
  a receiver.

The mobile sensor arrangement is configured to be moved through a spatial area, in particular through a building. The process or at least some steps of the process are automatically, i.e. without an input from a human, executed while the mobile sensor arrangement is moved through the spatial area. The spatial area is in particular a smoke-filled or smoky building, and the mobile sensor arrangement is moved through at least one floor of the building, e.g. The spatial area may also belong to a production facility or a warehouse or other storage area or to a vehicle.

The transmitter group comprises at least one transmitter, preferably several transmitters. The transmitter or each transmitter of the transmitter group is at least temporarily connected or can be connected, preferably detachably, to a respective person of a given group of persons. The persons of the group of persons are, for example, firefighters or other rescue personnel working in a building or other spatial area. Preferably, each person of the group of persons is connected to a respective transmitter of the group of transmitters while this person is in the spatial area. In particular, to achieve redundancy, the same person may simultaneously be connected to two different transmitters of the transmitter group.

The or each transmitter of the transmitter group is capable of generating and emitting (radiating) a signal, preferably by radio waves. The receiver is able to receive a respective signal from each transmitter of the transmitter group. It is possible that the receiver does not receive a signal from one transmitter at a time or that it simultaneously receives a respective signal from at least two transmitters of the group of transmitters. The feature that the receiver comprises a signal from a transmitter also comprises the embodiment that the receiver at least temporarily exchanges signals with the transmitter. Typically, the receiver receives the signal from the transmitter wirelessly, i.e., via radio waves.

The signal processing unit is capable of receiving a respective signal from the camera, a signal from the motion sensor, and a signal from the receiver, in one embodiment by wire and in one embodiment wirelessly, and to process the received signals.

A three-dimensional coordinate system is predefined (given), preferably an orthogonal three-dimensional coordinate system. This predefined coordinate system is preferably a global, i.e. stationary coordinate system.

The camera is able to generate a sequence of images, which sequence includes a temporal sequence with several images.

The motion sensor is capable of generating an orientation signal. This orientation signal describes exactly or at least approximately the respective viewing direction of the camera in the coordinate system at a moment in which the camera generates an image of the image sequence. Preferably, the orientation signal comprises a sequence of three-dimensional vectors, each vector describing the respective viewing direction in the coordinate system for each moment in which the camera generates an image.

The image evaluation process according to the invention comprises the following steps, and the image evaluation system according to the invention is configured to perform the following steps, wherein these steps—optionally with the exception of the first step—are performed automatically:

The mobile sensor arrangement is moved through a spatial area, for example through a building. When doing so, the camera, the motion sensor and the receiver are moved through the spatial area.

The camera generates an image sequence, which consists of or comprises a sequence of images. The camera generates the sequence of images while the camera is moved as a part of the mobile sensor arrangement through the spatial area.

The motion sensor generates an orientation signal. This orientation signal describes the respective viewing direction of the camera at the moment when the camera generates an image of the image sequence, i.e. a sequence of viewing directions.

The signal processing unit repeatedly checks whether the receiver of the mobile sensor arrangement is currently receiving a signal from a transmitter of the transmitter group. It is possible that at one time point the receiver receives several signals from different transmitters of the group of transmitters. Of course, it is also possible that the receiver is currently or sometimes not receiving a signal from any transmitter.

The event of the receiver receiving a signal from a transmitter of the transmitter group triggers the step of the signal processing unit determining an indicator for the distance between the transmitter that sends or has sent the received signal, and the receiver of the mobile sensor arrangement.

If the receiver receives at least two signals simultaneously, the signal processing unit preferably determines the indicator for the respective distance between this transmitter and the receiver, i.e. at least two distances.

The classifier searches in at least one image of the image sequence for each picture of a human shown in this image. The search is repeated with at least one respective image for every search. This human can be a person of the group of persons or another human. In the following the term "human" is used if this term can denote a person of the group of persons each being provided with a transmitter or can denote another human being. Of course, it is possible that pictures of two different humans are shown in one image, or no picture of a human is shown. As a rule, the image does not show a human completely, but only partially.

The classifier performs the search for a picture of a human at least in response to the receiver having received a signal from a transmitter of the transmitter group. The search relates to at least one image of the sequence of images generated by the camera in the time period in which the receiver received the signal. It is possible that the classifier also searches for any picture of a human in such images of the image sequence that have been generated while the receiver has not received a signal from a transmitter.

According to the invention, the classifier searches for a picture of a human in an image of the image sequence. The feature that the classifier recognizes (detects) a picture of a human means that the classifier classifies a subarea of the image with sufficient certainty as a picture of a human. Of course, it is possible that this image shows only part of a human. "With sufficient certainty" means that the reliability of this classification (recognition) is above a predefined threshold. Of course, it is possible that the classifier incorrectly classifies a portion of the image as a picture of a human, or fails to recognize a picture of a human in the image.

The signal processing unit decides whether an image of the image sequence shows a person associated with a transmitter of the transmitter group. For this decision the signal processing unit uses on the one hand a result of the classifier. This result preferably comprises the result that the classifier has recognized with sufficient certainty in the image a picture of a human. The result of the classifier does not necessarily comprise the result whether this human is a person belonging to the group of persons or another human. The signal processing unit further uses the orientation signal for the decision. As already explained, the orientation signal comprises information about the orientation, i.e. about the viewing direction of the camera in the three-dimensional coordinate system, at the moment when the camera has generated that image in which a picture of a human is shown with sufficient certainty.

According to the invention, the classifier searches for a picture of a human in an image at least if this image has been generated in a time period in which the receiver has received a signal from a transmitter of the transmitter group. The person associated with that transmitter may be in or out of the field of view of the camera. According to the invention, the event that the receiver has received a signal from a transmitter triggers the step that the signal processing unit determines the distance between the receiver and this transmitter. For deciding whether the image shows a person of the groups of persons or not, the signal processing unit uses in addition to the orientation signal the distance determined according to the invention. If the receiver receives at least two signals from two different transmitters of the transmitter group in a time period in which the image has been generated, the signal processing unit preferably uses both determined distances. If the image has been generated in a time period in which the receiver has not received a signal, then the signal processing unit naturally does not use a currently determined distance.

According to the invention, for the step of recognizing a picture of a person of the group of persons in an image of the sequence of images, not only the recognition result of the classifier is used, but additionally the determined distance between a transmitter and the receiver is used. This transmitter is carried by a person of the group of persons. Thus, the invention increases the reliability that a picture of a person of the group of persons is recognized in an image of the sequence of images and that erroneous recognition is avoided. In many cases, this is especially true when a result of the classifier that a portion of an image is a picture of a human is still subject to a relatively large uncertainty.

According to the invention, the signal processing unit uses a signal received by the receiver from a transmitter of the transmitter group to decide whether a picture of a human originates from a person of the group of persons or from another human. In many cases, the persons of the group of persons are distinguished in a visually perceptible manner from other humans as well as from objects that are or may be present in the spatial area. In particular, firefighters and other rescue personnel each wear appropriate protective equipment. It is possible to detect by image evaluation whether or not a picture of a human in an image of the sequence of images shows appropriate protective equipment. The invention can be used in combination with such an image evaluation but avoids the necessity to detect by an image evaluation a picture of protective equipment in an image. Such image evaluation can be erroneous and also often requires more computing power and/or processing time.

In one application, the invention is used to search the spatial area for humans who are to be rescued or at least recovered from the spatial area. The persons of the group of persons belong to a response team (task force) of firefighters and/or of other emergency personnel. Before a person of the group enters the area, he or she is connected to a transmitter of the transmitter group. One member of the response team carries the mobile sensor arrangement while the member moves through the area. It is possible that at least two members of the response team each carry a mobile sensor arrangement.

In many cases, the invention allows a member of the response team to use a mobile sensor arrangement to locate in the spatial area any other member of the response team.

Furthermore, a member of the response team can always check whether another member of the response team is in the vicinity and therefore whether the receiver of the mobile sensor arrangement is receiving a signal from a transmitter of the transmitter group. In particular, this makes it possible to check whether a safety requirement is being met, namely the requirement that there should be two firefighters in a room at the same time or no firefighters at all, but not one firefighter alone.

In a preferred embodiment, the motion sensor is able to generate not only the orientation signal, but also a motion signal. This motion signal describes the movements of the camera in the three-dimensional coordinate system. According to this embodiment, the process according to the invention and the image evaluation system according to the invention are able to determine a trajectory. This trajectory describes at least approximately the actual motion path of the camera through the spatial area, whereby the camera has executed or is executing this motion path while the camera is moved through the spatial area as a part of the mobile sensor arrangement.

A "trajectory" is a set of data that describes the motion path of an object, in this case the camera, in the predefined three-dimensional coordinate system, preferably also the respective viewing direction of the camera at a specific point of the motion path. As a rule, the trajectory describes only approximately the actual motion path of the camera. The trajectory describes the motion path that the camera has traveled in the past. Preferably, the trajectory comprises for a sequence of sampling times in each case a definition of the location at which the object was located in the coordinate system at this sampling time, as well as the orientation of a reference axis of the object in this coordinate system. The reference axis moves together with the object through the spatial area.

The trajectory, which is determined according to the embodiment, subsequently describes the motion path of the camera in the predefined three-dimensional coordinate system. It is possible that the trajectory is continuously added to and thereby updated as the camera is moved through the spatial area. It is also possible that the trajectory is determined only after the movement of the mobile sensor arrangement, and thus the camera, through the spatial area is completed. In particular, the trajectory can be represented visually, for example in a perspective representation or also in a cross-sectional representation. In many cases, the representation can be rotated. The trajectory can also be compared to a predefined target motion path of the camera.

The trajectory can be used to determine which motion path the person carrying the mobile sensor arrangement has taken through the spatial area. In particular, the trajectory can be used to determine which path a firefighter has taken through the building. In particular, it can be determined whether the firefighter has entered each room at least once. In each room, there may be at least one human to be rescued. Thanks to the preferred embodiment of the invention, in many cases the trajectory deviates less from the actual motion path than if the trajectory had been obtained in a different way.

According to the preferred embodiment, the signal processing unit determines the trajectory describing the motion path of the camera. To determine the trajectory, the signal processing unit uses at least the following information:

the motion signal,
the orientation signal,
images of the images sequence and
pictures of humans, which the classifier has recognized in images of the image sequence—or at least the contours of such pictures.

To determine the trajectory, the signal processing unit uses the motion signal on the one hand. However, a trajectory that is determined exclusively on the basis of a motion signal often exhibits a relatively large deviation from the actual motion path. Therefore, the signal processing unit additionally uses images of the image sequence as well as the orientation signal. The orientation signal preferably comprises for each image of the image sequence the information in which viewing direction the camera was oriented when it generated this image. Furthermore, the signal processing unit uses the result of the classifier, i.e. any result that a subarea of an image of the sequence of images completely or at least partially shows a human, and/or the result that an image does not comprise a picture of a human. As explained above, the signal processing unit uses the determined distance between a transmitter and the receiver to increase the reliability of a result of the classifier.

In one embodiment, each image of the sequence of images additionally comprises a time stamp, and each point of a sequence of points of the determined trajectory is also assigned a time stamp. Many images of the image sequence show visually recognizable features of the spatial area, in particular components of buildings and other objects in the spatial area.

Because images of the image sequence are used in addition to the motion signal, in many cases a trajectory is determined that deviates less from the actual motion path of the camera compared to a trajectory determined solely based on the motion signal. This is particularly true if the mobile sensor arrangement is first moved through a first subarea of the spatial area, then through a second subarea, and then through the first subarea again. This event occurs in particular if a firefighter or other rescue worker carries the mobile sensor arrangement with him/her while searching the spatial area for humans to be rescued.

In many cases, the camera generates images of the same subarea of the spatial area from different viewing directions. Ideally, the signal processing unit recognizes this subarea despite of the different viewing directions. However, it should be prevented that the signal processing unit mistakes the picture of a human in an image of the image sequence for a picture of a subarea of the spatial area. Indeed, this human may move or be moved through the spatial area or even out of the spatial area while the mobile sensor arrangement is moved through the spatial area. The invention enables the signal processing unit, in the step of determining the trajectory and using images of the sequence of images for this purpose, to exclude such segments of images that each show a picture of a human. In particular, such segments are not searched for characteristic subareas. For example, the signal processing unit places a predefined two-dimensional geometric figure, in particular a rectangle or an ellipse, around the picture of a human in an image of the sequence of images and excludes the interior of this geometric shape from the search for subareas of the spatial area in the image.

A human whose picture is recognized in an image can be a person of the group of persons or another human, for example a human to be rescued or also a bystander (spectator, onlooker). Especially the persons of the group of persons often move through the spatial area, especially to search for humans to be rescued or also, for example, for sources of fire. Therefore, it is especially important to reliably detect the pictures of persons of the group of persons and not to use them for the determination of the trajectory.

According to the just described embodiment, the signal processing unit determines a trajectory. This trajectory approximately describes the actual motion path of the camera through the spatial area and through the predefined three-dimensional coordinate system. To determine the trajectory, the signal processing unit uses the motion signal as well as images of the image sequence and the orientation signal. In one embodiment of how the trajectory is determined, the signal processing unit additionally uses key segments, preferably corners (vertices). A key segment is a segment of the spatial area whose picture is recognizable in different images of the camera, even if these different images were generated from different viewing directions. A key segment is ideally stationary, i.e., it does not move relative to the spatial area and thus does not move relative to the camera as long as the camera is not moved. The embodiment of using key segments for determining the trajectory increases the reliability that the determined trajectory matches the actual motion path of the camera relatively well, and in particular when the mobile sensor arrangement is first in a first subarea of the spatial area, then in a second subarea, and then again in the first subarea.

In the step of determining key segments, the signal processing unit excludes those image areas of the images that show a picture of a human in full or at least in part. This is because this human can move or be moved relative to the spatial area. The reliability with which the signal processing unit recognizes stationary key segments also depends on how reliably the classifier recognizes pictures of humans in images of the sequence of images. This reliability is increased, because according to the invention not only images of the image sequence are used, but additionally measured distances between each transmitter of the transmitter group and the receiver is used.

According to the invention, the picture of a person of the group of persons in an image of the image sequence is recognized not only on the basis of the contour and optionally of heat tone values, but in many cases additionally on the basis of a measured distance between a transmitter of the transmitter group and the receiver. Therefore, the invention in many cases increases the reliability that a picture of a person or other human is recognized—or that it is excluded that an image shows a picture of a human. According to the embodiment just described, key segments are not searched for in a portion of an image showing a picture of a human. A human may move or be moved relative to the spatial area. In many cases, this is especially true for the persons of the group of persons. Because key segments are not searched for in a subarea showing a human, the risk that the trajectory deviates significantly from the actual motion path of the camera is reduced. This undesirable result could occur if a segment detected as a key segment were located in a picture of a human and that human were moving or is moved through the spatial area.

According to the embodiment just described, the signal processing unit detects key segments in images of the image sequence. In a further embodiment of this embodiment, the signal processing unit determines such key segments shown in at least two consecutive images of the image sequence. According to the further embodiment, the signal processing unit determines a three-dimensional initial trajectory, then using the initial trajectory determines a three-dimensional corrected trajectory, and then using the corrected trajectory determines the final three-dimensional camera trajectory to be used as the trajectory of the camera.

The signal processing unit determines the initial trajectory using the determined key segments as well as the motion signal and optionally the orientation signal.

The signal processing unit determines key segments that are shown in at least two non-consecutive images of the image sequence. Such a key segment occurs in two images of the image sequence, whereby between these two images at least one image of the image sequence occurs which does not show this key segment. With other words: In a first phase the camera has generated at least one image in this subarea, afterwards at least one image in another subarea and in a subsequent second phase again at least one image in the subarea. Each subarea of the spatial area in which the camera has generated at least one image at least twice leads to a respective corrected trajectory segment in the corrected trajectory. The distance between two corrected trajectory sections is less than or equal to the distance between the corresponding initial trajectory sections, i.e. the corresponding sections in the initial trajectory.

The signal processing unit generates the final camera trajectory from the corrected trajectory by computationally eliminating at least approximately any possible vertical drift in the corrected trajectory. Here, for each section of the corrected trajectory that has a vertical extent (dimension) above a given lower threshold, the signal processing unit decides whether this section involves a change between two different horizontal subareas of the spatial area, or extends completely in the same subarea.

Here, the assumption is used that the floor area of the spatial area consists of horizontal areas. This assumption is often justified for buildings and other spatial areas. Between two horizontal sections that are not on the same plane, there is usually a height difference that is greater than a predefined lower threshold. A section of the trajectories therefore has a vertical dimension greater than this lower threshold.

In many cases this further embodiment computationally eliminates an error that sometimes builds up, particularly when the motion sensor includes an inertial sensor unit, the inertial sensor unit measures a measure of linear acceleration and/or a measure of angular acceleration, and the motion signal is derived from the measured accelerations. Namely, the motion sensor numerically integrates over multiple measured values of acceleration to calculate distances and thus velocities and further distances and positions. This procedure can lead to a drift in the initial trajectory. In the corrected trajectory, in many cases this drift is completely or at least partially eliminated by calculation.

The trajectory, which is determined according to one of the embodiments just described, can be used in particular to automatically determine a floor plan. Such a floor plan shows in particular walls and passages in the spatial area. Having such a floor plan available is particularly useful if the spatial area is a floor of a building and the floor may be smoky or smoke-filled. The floor plan can also refer to an area in a production facility or a storage area, or even a vehicle. When a fire or other emergency breaks out, a floor plan is often not available. Or an available floor plan may be out of date. The application described below, which determines a floor plan, eliminates the need to provide an up-to-date floor plan.

The signal processing unit uses the trajectory generated according to the embodiments just described to determine this floor plan. This trajectory describes the motion path of the camera through the floor. Preferably, the signal processing unit uses the final camera trajectory generated according to the implementation just described to generate the floor plan. Typically, the floor plan determined according to the embodiment deviates from the actual floor plan. Even if it differs, the determined floor plan often makes it easier for a rescue worker or other person to orient himself/herself in the spatial area.

The signal processing unit further determines contiguous horizontal area segments in the images of the image sequence. These contiguous area segments are not separated from each other by a wall or other object inside the spatial area. In the step of searching for contiguous horizontal area segments, the signal processing unit excludes such segments of the images, each of which shows at least one picture of a human. Further above it was described how such pictures of a human are automatically detected in images of the sequence of images. To determine the floor plan, the signal processing unit uses the trajectory and the determined contiguous horizontal area segments. Preferably the signal processing unit determines contiguous floor segments by using the contiguous area segments and determines the floor plan by using the contiguous floor segments and the trajectory, in particular the final trajectory.

In one application, the spatial area is a floor of a building. In particular, a fire has broken out in this building, or the outbreak of a fire is suspected. The features of the embodiment just described can be used to determine a floor plan of this floor in this application.

According to the invention, the camera generates a sequence of images while the camera together with the mobile sensor arrangement is moved through the area. In one embodiment, the camera generates all images or at least a portion of the images of the sequence of images in a wavelength range above 3 µm, particularly preferably above 7 µm, while moving through the area.

In many cases, a camera that operates according to this embodiment still delivers images that show contours of humans, other living beings, and/or objects even when the camera is used in a smoky and/or smoke-filled area. In general, a wavelength of at least 3 µm is larger than the maximum diameter of a particle that may be in the air. In contrast, a camera that produces images in the visible light range often does not provide useful images when used in a smoky and/or smoke-filled area. In addition, if the wavelength range is even above 7 µm, the risk of air humidity causing disturbing haze in the images is reduced.

In many cases, the signal processing unit is able to determine heat tone values in images that have been generated in a wavelength range above 3 µm. A picture of a living being in a heat tone image usually has higher heat tone values than a picture of an object. The heat tone values allow in many cases to decide with higher certainty whether a contour, appearing in an image of the image sequence, frames a picture of a living being or a picture of a mirror image or an object, compared to an image generated at light in the visible range.

It is possible that the mobile sensor arrangement comprises a camera capable of generating images in the visible wavelength range in addition to or in place of the camera just described, which is capable of generating images in a wavelength range above 3 µm. It is also possible to use a camera which can selectively generate images in the visible wavelength range or in a wavelength range above 3 µm. Preferably, the classifier determines images, in particular contours, of humans both in the images in the wavelength range above 3 µm and in the images in the visible wavelength range.

The embodiment of using both a first camera for images in the wavelength range above 3 µm and a second camera for images in the visible wavelength range is useful in many cases, in particular for the following reason: Often, only a first subarea of the spatial area is smoky or smoke filled when a fire has broken out, while a second subarea is neither smoky nor smoke filled. In the first subarea, the first camera is used for images in the wavelength range above 3 µm, while in the second subarea, the second camera is used for images in the visible wavelength range.

According to the invention, the signal processing unit uses the determined distance between the receiver and a transmitter of the transmitter group to decide whether a picture of a human in an image of the image sequence shows a person associated with a transmitter of the transmitter group. In a preferred embodiment, when the receiver receives a signal from a transmitter of the transmitter group, the signal processing unit then determines not only the distance between that transmitter and the receiver, but additionally the direction from which the receiver receives the signal from that transmitter. For the just mentioned decision the signal processing unit additionally uses the determined direction. The determined direction can be the direction in a horizontal plane, thus consisting of two coordinates, or the direction in a three-dimensional coordinate system.

In one implementation, the signal processing unit determines the direction by measuring an angle of a distance from the transmitter to the receiver. This angle occurs in a three-dimensional coordinate system, for example in the predefined global, i.e. stationary, three-dimensional coordinate system or in a local coordinate system that moves with the mobile sensor arrangement through the spatial area and has a reference axis. Preferably, the reference axis coincides with the viewing direction of the camera or is parallel to the viewing direction or includes a fixed angle with this viewing direction.

The embodiment that the signal processing unit determines the direction increases the reliability with which the signal processing unit decides whether the image shows a person of the group of persons or somebody or something else. The orientation signal includes the position of the camera and the orientation, i.e., the viewing direction, of the camera in the three-dimensional coordinate system. An angle occurs between the viewing direction and the direction from which the receiver received the signal from the transmitter, which of course can be zero. If an image shows a picture of a person of the group of persons, this angle cannot be larger than an upper threshold, where this threshold can depend on the determined distance and/or on the imaging scale of the camera. If the angle is above this threshold, the picture cannot originate from a person of the group of persons, but originate from another human or from an object that looks similar to a human. In particular, the transmitter, and thus often a person associated with that transmitter, may then not be in the camera's field of view. If, on the other hand, the angle is below this threshold, then in many cases a picture of a person in the group of persons must be shown in the image. So, if additionally the direction from which the receiver has received a signal from a transmitter is used, in many cases it is possible that the signal processing unit checks a result of the classifier for plausibility.

According to the invention, the classifier searches for pictures of humans in images of the image sequence. In one embodiment, the signal processing unit determines the respective current position of the human whose picture the classifier has detected in an image. The determined position refers to the predefined three-dimensional coordinate system. To determine the position, the signal processing unit uses the motion signal described above, the orientation signal, and the or at least one image showing the picture of the human.

According to the invention, the motion sensor generates the orientation signal, and optionally also the motion signal. The orientation signal describes the time-varying viewing direction of the camera, the motion signal describes the movements of the camera. Preferably, the orientation and the motion signal describes the orientations and movements of the motion sensor itself, resp., and the movements and orientations of the camera are derived using the motion sensor's own measured movements and orientation.

In one implementation, the motion sensor comprises an inertial sensor unit. As the camera is moved, the inertial sensor unit generates a respective measure for each linear acceleration and each angular acceleration of the moved camera where the linear accelerations and angular accelerations refer to the predefined three-dimensional coordinate system. Of course, no linear acceleration and/or no angular acceleration can occur at individual sampling times, i.e. the respective acceleration can assume a value of zero. Depending on the measured dimensions, the inertial sensor unit generates an acceleration signal. This acceleration signal describes the accelerations of the inertial sensor unit through the spatial area. Preferably, the acceleration signal comprises six values for each sampling time, namely three values for the three linear accelerations and three values for the three angular accelerations. The orientation signal and/or the motion signal are derived using the acceleration signal. It is possible that the motion sensor additionally or instead comprises a geoposition sensor. However, often a geoposition sensor inside a building is not able to reliably receive a geoposition signal.

In one embodiment, the motion sensor is mechanically fixed to the camera. In another embodiment, the motion sensor can move relative to the camera. However, the distance between the motion sensor and the camera always remains below 1 m, especially preferably below 0.5 m. An own position and orientation measured by the motion sensor therefore often applies with sufficient accuracy also to the camera.

In one embodiment, the receiver is also fixed mechanically to the camera. In another embodiment, the receiver can move relative to the camera. However, the distance between the receiver and the camera always remains below 1 m, particularly preferably below 0.5 m. In many cases, therefore, the distance between a transmitter of the transmitter group and the receiver coincides sufficiently precisely with the distance between the transmitter and the camera.

In another embodiment, the current distance between the camera and the receiver is measured, preferably repeatedly measured. For example, the mobile sensor arrangement comprises a further transmitter that cannot perform relative movement relative to the camera and that is moved through the spatial area as a part of the mobile sensor arrangement. The receiver receives a further signal from this further transmitter, and the signal processing unit derives the distance between the receiver and the further transmitter from the further signal, for example from the signal strength and/or the propagation time. Optionally, the orientation of a line between the receiver and the camera in the three-dimensional coordinate system is also determined.

The embodiment that the distance between the motion sensor and the receiver remains below a predefined threshold and the embodiment that the distance between the camera and the receiver is measured can be combined.

In one application, the invention is used by firefighters and other emergency responders entering a building or other spatial area. The members of this response team act as the group of persons. Each person in the group of persons wears protective equipment. Each transmitter in the group of persons is attached to the protective equipment of a person in the group of persons. Preferably, the transmitter remains on the protective equipment while the person is in the spatial area.

According to the invention, the mobile sensor arrangement is moved through the spatial area. It is possible that an autonomous vehicle moves the mobile sensor arrangement through the area. In a preferred embodiment, however, the mobile sensor arrangement is attached to a protective equipment of a person. The person with the protective equipment and the mobile sensor arrangement attached to the protective equipment moves through the spatial area. By the person with the protective equipment and the mobile sensor arrangement on the protective equipment moving through the spatial area, the mobile sensor arrangement is moved through the spatial area. This embodiment eliminates the need to use a vehicle specifically for the purpose of moving the mobile sensor arrangement through the spatial area. For example, the person is a firefighter of an initial response team (attack squad). Also, thanks to the invention, the person with the mobile sensor arrangement generally does not need to travel any additional distance, but carries the mobile sensor arrangement with him or her while searching the spatial area for humans and performing his or her other work.

It is possible that the person with the mobile sensor equipment is also at least temporarily connected to a transmitter of the transmitter group. It is also possible that at least two persons of the group of persons each carry a mobile sensor arrangement while moving through the spatial area.

In one implementation, the receiver of the mobile sensor arrangement is attached to a protective helmet, whereby this protective helmet is part of the protective equipment of the person carrying the mobile sensor arrangement. Each transmitter of the transmitter group is also attached to a protective helmet. This embodiment reduces the risk of the following undesired event: although there is currently a line of sight between a transmitter of the transmitter group and the receiver, the signal from that transmitter does not reach the receiver because the signal is shielded. This is because, in some embodiments, a person's body shields a signal.

In one embodiment, a further transmitter is associated with a human who is already in or on the spatial area. For example, a person of the group of persons carries a further transmitter, wherein the further transmitter is preferably switched off as long as it is not connected to a human. This further human is not part of the group of persons and is preferably connected to the transmitter while the mobile sensor arrangement is carried through the area. The further human is, for example, a human to be rescued or recovered from the spatial area. The embodiment of attaching a transmitter to this human increases the safety of locating this human, even if the spatial area is smoky or smoke-filled. Locating a human is important, for example, when a human to be rescued has been discovered and cannot be moved out of the area immediately after discovery, i.e., cannot be rescued or at least recovered immediately. The step of providing this human to be rescued with the further transmitter usually takes very little time.

Preferably, the further human is connected to the transmitter after the classifier locates a picture of that further human in at least one frame of the camera. This event makes it easier in many cases to locate the further human in order to attach the further transmitter. Later, the human with the further transmitter can be located and rescued or at least recovered just like a person of the group of persons.

According to the invention, the receiver is able to receive a signal from each transmitter of the transmitter group. Preferably, this signal comprises a unique identifier (ID) which distinguishes this transmitter or the person carrying this transmitter from any other transmitter or from any other person of the group of persons. Preferably, the optional further transmitter just described also comprises its own identifier, this identifier being different from the identifiers of those transmitters which are each associated with a person of the group of persons.

The embodiment that each signal from a transmitter of the transmitter group comprises a unique identifier makes it easier for the signal processing unit to distinguish two transmitter signals from each other in many cases, even if the receiver receives these two signals simultaneously and the two transmitters are similarly far away from the receiver. In some cases, this embodiment also reduces the risk that the classifier therefore fails to recognize the picture of one person of the group of persons because this picture overlaps with the picture of another person of the group of persons. This situation can be recognized in many cases due to the different identifiers and can be distinguished from the situation that the image does not show the picture of a person or only the picture of a single person.

In one embodiment, the signal processing unit is capable of controlling a display unit. The display unit may be an additional component of the mobile sensor arrangement and is then moved through the spatial area. It is also possible that the display unit is used by another person of the group of persons or is also arranged outside of the spatial area and/or stationary. For example, the display unit is accompanied at the protective equipment of the person, in particular at the protective helmet and in the field of vision of the person. If the display unit is attached to the protective helmet of a rescuer, the rescuer has his/her hands free.

The controlled display unit displays image of the sequence of images at least if the classifier has recognized at least one picture of a human in this image. It is possible that the controlled display unit displays each image of the image sequence one after the other, i.e. a sequence of images. If the picture shows a person of the group of persons, the picture of this person is displayed in the displayed image highlighted in a first way, highlighted from the rest of the image, whereby this rest does not show a picture of a human. Otherwise, if the image shows a human who does not belong to the group of persons, the picture is shown highlighted in a second way, the second way being different from the first way. In this way, the person carrying the display unit is able to quickly identify whether another person of the group of persons or another human is in the vicinity, and if so, where.

Preferably, the picture of a person of the group of persons is presented together with the unique identifier of the transmitter or person described above. This makes it easier to locate and/or identify a particular person of the group of persons. In one embodiment, the picture of a person of the group of persons is displayed on the controlled display unit together with the determined distance between the transmitter associated with that person and the receiver.

According to the invention, the image evaluation system comprises a signal processing unit. This signal processing unit determines the distance between a transmitter of the transmitter group and the receiver of the mobile sensor arrangement and decides whether or not an image of the image sequence shows a person of the group of persons. In one implementation, the signal processing unit is part of the mobile sensor arrangement. The signal processing unit may also be spatially separated from the mobile sensor arrangement and may be moved through the area separately and independently of the mobile sensor arrangement, or may be arranged outside of the spatial area and/or stationary. The signal processing unit may also include multiple components, with at least one component being part of the mobile sensor arrangement and at least one other component being spatially spaced apart from the mobile sensor arrangement. A component of the signal processing unit may also be a functional part of the classifier. The signal processing unit receives an image signal from the camera, a signal from the receiver, and at least one signal from the motion sensor.

According to the invention, the receiver is able to receive a signal from each transmitter of the transmitter group. In one implementation form, each transmitter exchanges signals with the receiver. Each transmitted signal comprises a respective time stamp. The signal processing unit determines the distance between the transmitter and the receiver depending on the propagation time of the radio waves and the time stamp. The "Ultra Wideband (UWB)" transmission protocol uses this process with a wavelength range of 800 MHz to 6 GHz. In many cases, the distance can be determined with an accuracy of 30 cm when using UWB.

In another implementation form, the or each transmitter emits a signal at least once with a signal intensity known or communicated as part of the signal. The signal processing unit measures the distance based on an attenuation of the signal intensity, where this attenuation correlates with the distance. This is how the "Bluetooth Low Energy (BLE)" transmission protocol works, for example.

In one implementation, the receiver is able to automatically decide whether there is a line of sight between the transmitter and the receiver and therefore the signal or each signal can travel directly from the transmitter to the receiver or whether the signal is reflected at least once. Only in the first case, the receiver uses the received signal or the exchanged signals to determine the distance and optionally the direction. Only in the first case can the distance be determined as a direct straight line (as the crow flies).

According to the invention, the classifier searches for a picture of a human in an image of the image sequence. In many cases, the classifier is not able to decide with a predefined certainty, based solely on a contour in this image, whether this contour actually frames the picture of a human or, for example, the picture of a mirror image of a human or of an object that has the contour of a human, in particular a doll. In one embodiment, the signal processing unit uses the distance determined according to the invention between a transmitter of the transmitter group and the receiver for checking whether or not a contour frames a picture of a person of the group of persons. From the determined distance, the signal processing unit preferably derives an estimate for how large a picture of a person positioned at that distance from the receiver, and thus from the camera, is in an image generated at that time. Using this estimated size, the signal processing unit decides whether the contour can come from a picture of a person or not.

Optionally, the classifier additionally uses heat tone values of the image to distinguish the picture of a human from the picture of an object. Of course, this embodiment assumes that the camera generates heat tone images. Because a distance between a transmitter of the transmitter group and the receiver is determined according to the invention, the invention can in many cases be used even if the camera does not produce heat tone images. In many cases, the determined distance can be used to infer the minimum and maximum size of a picture of a human in an image of the image sequence.

In one embodiment, the signal processing unit repeatedly determines the distance between a transmitter of the transmitter group and the receiver, for example with a fixed sampling frequency. In general, the distance between the transmitter and the receiver does not change abruptly, but gradually. Therefore, in many cases, the movement of the person connected to this transmitter can be followed ("tracked") relative to the receiver. The reliability is improved if additionally the respective picture of this person is tracked in a sequence of images of the image sequence.

According to the invention, the classifier searches for a picture of a human in an image at least in response to the receiver receiving a signal from a transmitter. In one embodiment, the classifier searches for a picture of a human at a fixed sampling frequency in the last image generated. In this way, pictures of humans who do not belong to the group of persons are also recognized with a relatively high degree of certainty. It is also possible that the classifier searches again for a picture of a human in the last generated image, if the camera has made a sufficiently large movement since the penultimate image. The step that the classifier searches for a picture of a human is thus triggered depending on the orientation signal and/or the optional motion signal.

In another embodiment, the process of the classifier searching for a picture of a human in an image is triggered by the event that the receiver has received a signal from a transmitter of the transmitter group. The classifier searches for pictures of humans only in those images of the sequence of images that have been generated while the receiver has received at least one signal from a transmitter of the transmitter group. This embodiment reduces the required computing capacity and/or computing time. In addition to the images of the image sequence, the orientation signal and the distance are available for searching for pictures of humans. In many cases, the reliability is high that at least every picture of a human in an image of the image sequence is detected.

According to the invention, the classifier searches for a picture of a human in at least one image of the sequence of images. In one embodiment, the classifier detects in an image of the sequence of images any contour that frames a picture of a human. Of course, it is possible that this contour frames only a portion of the picture of a human. For example, the classifier uses a computer-interpretable library (annotated sample) of already-classified pictures of objects, where some of these pictures show humans and some of these pictures show objects.

In the following, the invention is described by means of embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings

FIG. 7 is a schematic view showing detected key points in images of the infrared camera;

DESCRIPTION OF PREFERRED EMBODIMENTS

Possible Applications of the Invention

Several preferred applications of the invention are described below. A fire has broken out or has occurred in a building. At least it is suspected that a fire has broken out or has been in this building. Therefore, it is expected that the building or at least one floor of the building is smoky and/or smoke filled. This building or at least one floor of this building acts as the spatial area.

A so-called initial attack squad (response team) with several firefighters goes through this building. As a rule, the firefighters do not know the inside of the building. There may be at least one human in the building who needs to be rescued, i.e. removed from the building. In addition, there may be bystanders in the building. In the following, the generic term "human" is used. This term can refer to a firefighter of the initial attack squad as well as a human to be rescued or to a bystander. The firefighters of the initial attack squad act as the persons of the group of persons.

Of course, the building may include several rooms with doors and windows, and there may be furnishings in rooms of the building.

Figure 1:
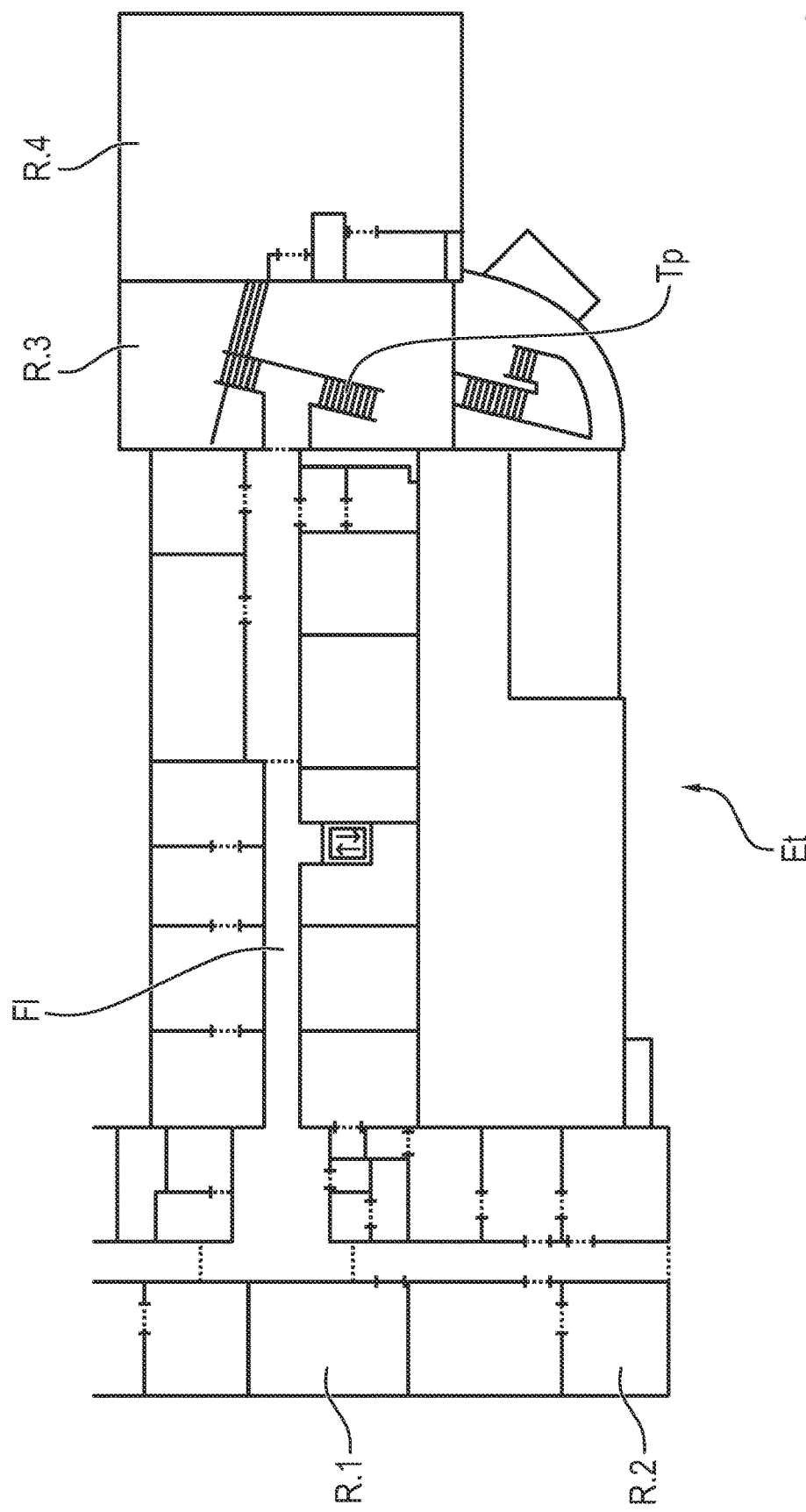
FIG. 1 is a floor plan of a floor of a building, the floor plan having been generated in advance and without the use of the invention.

FIG. 1 shows an exemplary floor plan of a floor Et of a building, this floor plan having been generated in advance and without using the invention. This floor Et acts as a spatial area in the sense of the claims. A corridor Fl, several rooms R.1, R.2, . . . as well as several stairs, including the staircase Tp, can be seen. In practice, such a floor plan is usually not available for the use of firefighters.

In particular, the invention can be used for the following purposes:
- A human is to be rescued from the burning or smoky building and is to be located for this purpose.
- Each firefighter in the initial attack squad should be visualized, providing a showing of where the other firefighters in the initial attack squad are currently located.
- A trajectory is to be determined, where the trajectory describes the motion path of a firefighter through the building.
- A floor plan of one floor of the building shall be identified and provided to all members of the initial attack squad.

All these applications are to be carried out under the boundary condition that the building is or can be smoky or smoke-filled and therefore humans, other living beings or objects cannot be detected at all or can only be detected with difficulty in the visible wavelength range.

Firefighters' Equipment

Figure 2:
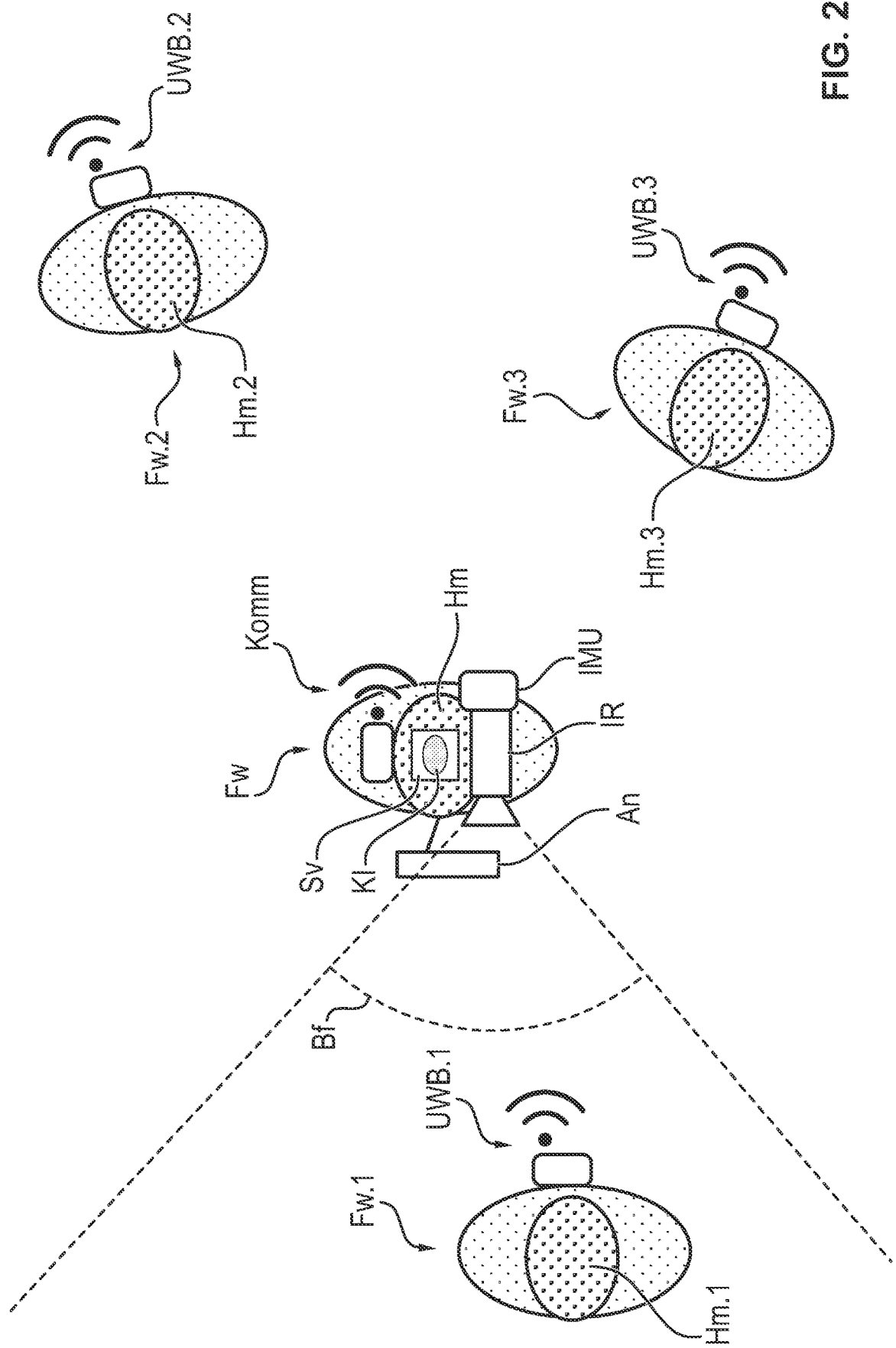
FIG. 2 is a schematic view of an initial attack squad with four firefighters and their equipment.

FIG. 2 shows schematically from above a task force with four firefighters Fw, Fw.1, Fw.2, Fw.3. Each firefighter wears protective equipment, which includes
- a safety helmet Hm, Hm.1, Hm.2, Hm.3,
- protective clothing and
- a compressed air breathing apparatus on a rack with a carrying plate Pl.

At least one firefighter Fw also carries the following equipment on or in his or her protective gear:
- a communication unit Komm with a transmitter and a receiver,
- an infrared camera (thermal imaging camera) IR,
- optionally a camera (not shown) for images in the visible wavelength range,
- a motion sensor in the form of an inertial sensor unit IMU,
- optionally an infrared light source (not shown), for example a $CO_2$ laser, which emits light in the wavelength range of 10.6 μm, for example,
- optionally a rangefinder (not shown),
- optionally a geoposition sensor (not shown) that measures its own geoposition,
- optionally a schematically shown display unit An with a screen and
- a signal processing unit Sv.

The camera IR, the communication unit Komm and the inertial sensor unit IMU belong to the mobile sensor arrangement of the embodiment. This mobile sensor arrangement as well as the signal processing unit Sv and the optional devices just mentioned move with the firefighter Fw through the building and belong together to the image evaluation system of the embodiment.

A distance of no more than 1 m occurs between the devices carried by the firefighter Fw in each case, preferably of no more than 0.5 m. As a result, an own position or orientation or the distance of a device between itself and another object, which is measured by one of the sensors just mentioned, is also valid with sufficient accuracy for the camera IR and the communication unit Komm.

Preferably, the infrared camera IR, the inertial sensor unit IMU and the display unit An are attached to the protective helmet Hm of the firefighter Fw. In one embodiment, the receiver of the communication unit Komm is integrated into the infrared camera IR. In another embodiment, the entire communication unit Komm or the other components of the communication unit Komm except for the receiver are attached, for example, to a carrying plate Pl of a frame which the firefighter Fw carries on his or her back and which carries a compressed air breathing apparatus with at least one bottle for breathing air. The embodiment of attaching the communication unit Komm to the carrying plate Pl and not to the protective helmet Hm reduces the weight of the protective helmet Hm and thus the strain on the neck and throat of the firefighter Fw when wearing the protective helmet Hm. In addition, it is often technically easier to attach an object to the carrying plate Pl instead of to the protective helmet Hm.

Because of the preferred embodiments just described, the firefighter Fw has his or her hands free.

The display unit An is preferably arranged in front of the face of the firefighter Fw and can be folded away to the side or upwards. Particularly preferably, the display unit An is configured as an in-mask display on the protective helmet Hm of the firefighter Fw. The firefighter Fw can look alternately at the surroundings and at the display unit An. Images from the infrared camera IR, enriched with additional information, are displayed on the display unit An. Described below is how some of this information is generated. The signal processing unit Sv is able to control the display unit An and, by means of the control, to cause the display unit An to display images with additional information in a visually perceptible form.

The three other firefighters Fw.1, Fw.2, Fw.3 each carry a locating unit comprising a transmitter UWB.1, UWB.2, UWB.3 and optionally also a display unit (not shown) on their protective equipment. The transmitter UWB.1, UWB.2, UWB.3 as well as the optional display unit are preferably attached to the respective protective helmet Hm.1, Hm.2, Hm.3. The optional display unit of another firefighter Fw.1, Fw.2, Fw.3 is also able to display images of the infrared camera IR, enriched with additional information.

Because the UWB.1, UWB.2, UWB.3 transmitter is mounted on a protective helmet Hm.1, Hm.2, Hm.3, there is less risk than in any other possible location for mounting that the firefighter's Fw.1, Fw.2, Fw.3 body or any component of his or her protective equipment will shield or attenuate or distort the signal from the UWB.1, UWB.2, UWB.3 transmitter.

It is possible that at least one other firefighter Fw.1, Fw.2, Fw.3 also carries an infrared camera, an inertial sensor unit and a display unit on his or her protective equipment. In this embodiment, preferably the firefighter Fw also carries a locating unit.

The infrared camera IR has a cone-shaped field of view. The center axis of this cone is referred to below as "the viewing direction" of the IR infrared camera. The images produced by the infrared camera IR will be referred to as "infrared images" in the following. The term "heat tone images" may also be used.

Figure 3:
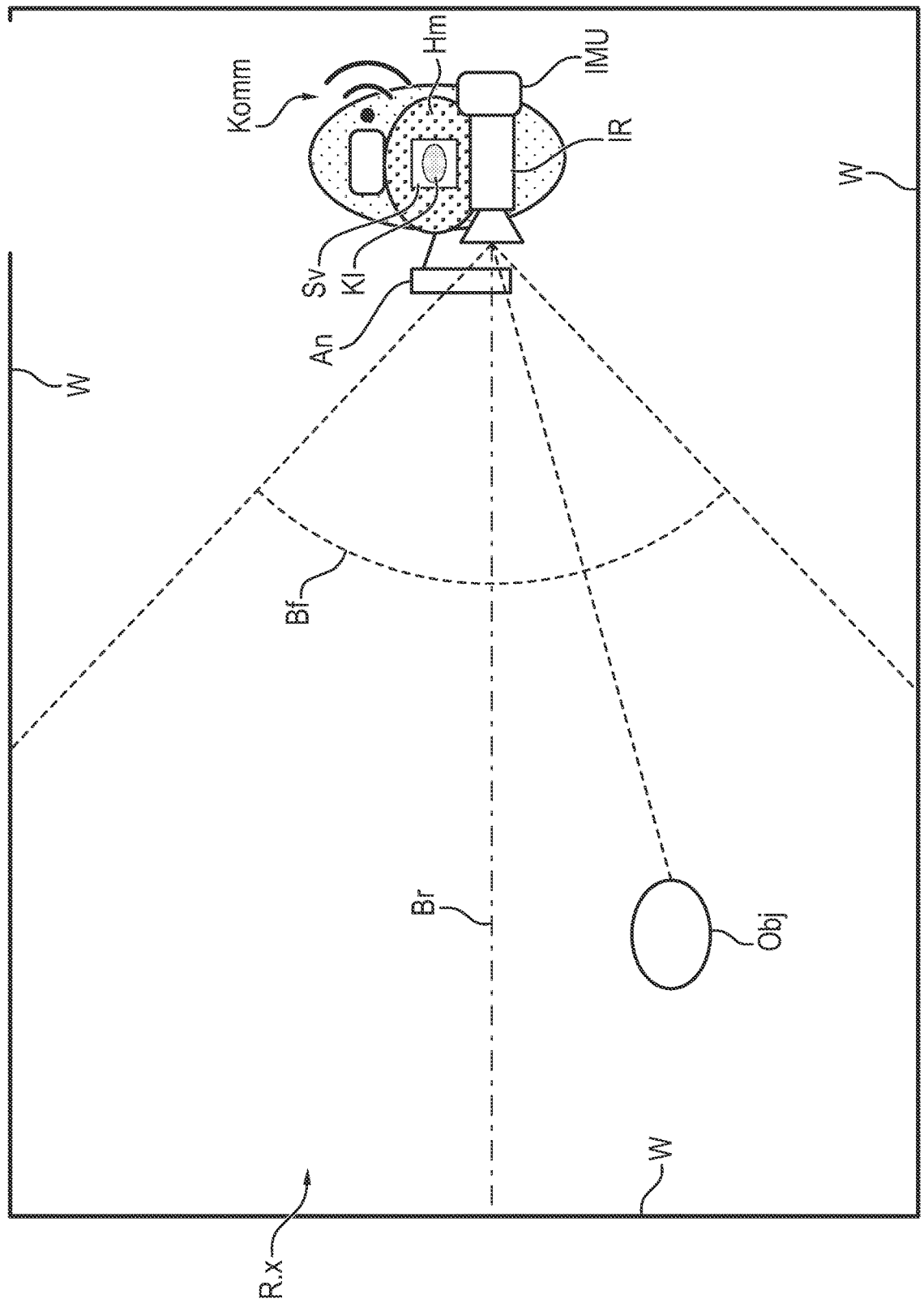
FIG. 3 is a schematic view showing the field of view of the infrared camera.

FIG. 3 schematically shows the field of view Bf and the viewing direction Br of the infrared camera IR on the protective helmet Hm of the firefighter Fw. The firefighter Fw is in a room R.x with a wall W. In this room R.x and in the field of view Bf there is an object Obj, and a picture of the object Obj is visible in the infrared images generated by the infrared camera IR at this field of view Bf.

The optional rangefinder of the firefighter Fw emits radio waves and receives the reflected radio waves. For example, the rangefinder emits laser beams or radar waves. By measuring the propagation time and/or the intensity of the received signal, the rangefinder is able to measure the distance between itself and a reflecting object Obj, W. Preferably, the direction in which the rangefinder is able to measure the distance is parallel to the viewing direction Br of the infrared camera IR. In general, the rangefinder is not able to detect the type of the reflecting object.

In FIG. 2 and in FIG. 3 the field of view Bf of the infrared camera IR is shown schematically. The infrared camera IR delivers images with heat tone values from an infrared spectrum, preferably in a wavelength range between 3 μm and 15 μm, especially preferably between 7 μm and 15 μm. In the wavelength range above 7 μm, there is little risk that moist air will lead to disturbing water lines in the infrared image. The infrared camera IR preferably comprises at least one photosensor and a data memory. One reason why an infrared camera is used is the following: the building may be smoke-filled or smoky. Typically, particles in a smoke-filled or smoky room are between 1 μm and 10 μm in diameter. Therefore, a camera that produces images in the visible wavelength range (between 350 nm and 760 nm) often does not provide useful results. The wavelength range of the IR infrared camera used, on the other hand, is larger than the largest diameter of a particle in the air.

In many cases, not the entire building is smoke filled and/or smoky when a fire has broken out or has been in a building. Rather, often only individual areas are smoky and/or smoke filled, for example only the room in which the fire has broken out. Therefore, in one embodiment, the firefighter Fw carries the optional camera for images in the visible wavelength range in addition to the infrared camera IR. In one embodiment, the infrared camera IR is mounted on the protective helmet Hm, and the camera for images in the visible wavelength range is mounted on the carrying plate Pl for the SCBA. It is also possible that the firefighter Fw carries a camera with two channels, namely one channel for infrared images and one channel for images in the visible wavelength range.

When the following description refers to "infrared images" as well as to "images of the infrared camera IR", this also refers to the images of the camera in the visible wavelength range, as far as the description can also be applied to images in the visible wavelength range.

A three-dimensional orthogonal coordinate system is predefined, which is global, i.e. stationary. The inertial motion unit (IMU) preferably comprises an acceleration sensor, which measures the respective linear acceleration in the three directions of the orthogonal coordinate system, and a gyrometer, which measures the three rotational speeds or angular accelerations. In one realization, the inertial sensor unit IMU additionally comprises a magnetometer, i.e., a sensor that measures the strength of the magnetic field caused by the earth in the three directions.

Preferably, the signal processing unit Sv calculates at each sampling time of the inertial sensor unit IMU which position and orientation the initial sensor unit IMU and thus the infrared camera IR currently has in the three-dimensional coordinate system. For this purpose, the signal processing unit Sv uses measured values of the inertial sensor unit IMU. The sequence of positions of the infrared camera IR is referred to as "motion signal", referred to the sequence of orientations as "orientation signal". Preferably, the position and orientation at a sampling time are described by a so-called 6D pose in the global coordinate system, which is a six-dimensional vector. Three components of this vector describe the position of a reference point of the infrared camera IR in the global coordinate system, the remaining three components describe the three angles between a reference axis of the infrared camera IR and the three axes of the global coordinate system. For example, the viewing direction Br is used as the reference axis. The reference axis maintains its position relative to the infrared camera IR and moves with the infrared camera IR through space, i.e. through the global coordinate system. It is also possible to describe the rotation position of the camera by a 3×3 matrix each or by a 4D quaternion per sampling time.

Signal Processing of the Image Evaluation System

Each transmitter UWB.1, UWB.2, UWB.3 is capable of wirelessly exchanging a sequence of signals in accordance with the Ultra Wideband (UWB) transmission protocol with the communication unit Komm in the embodiment. In the UWB transmission protocol, signals are pulsed and exchanged between two transceivers in a wavelength range between 800 MHz and 6 GHz. Some of these signals each include a time stamp.

As a result of the exchange of signals, the signal processing unit Sv is able to determine position information about the transmitter UWB.1, UWB.2, UWB.3 in each case. This position information comprises the respective distance between the receiver of the communication unit Komm and the transmitter UWB.1, UWB.2, UWB.3, with an accuracy of about 30 cm. Note: If the UWB transmission protocol is used, the designations "transmitter" and "receiver" are not strictly speaking correct, but the designation "transmitter-receiver unit". If the distance between two devices is determined according to the UWB transmission protocol, then each of these two devices transmits a signal several times and also receives a signal several times. Nevertheless, in the following, the device that belongs to the communication unit Komm of the firefighter Fw and determines the distance is called the receiver, and the device that the further firefighter Fw.1, Fw.2, Fw.3 carries as part of the locating unit is called the transmitter.

It is also possible, for example, that the distance between the communication unit Komm and a transmitter UWB.1, UWB.2, UWB.3 is measured according to the Bluetooth Low Energy (BLE) transmission protocol. In this transmission protocol, a transmitter sends a signal to a receiver, and the receiver measures the intensity of the received signal. The signal processing unit Sv derives the distance from the signal intensity. The lower the signal intensity, the more the signal has been attenuated on its way from the transmitter to the receiver, and the greater the distance.

It is possible that a signal from a transmitter UWB.1, UWB.2, UWB.3 reaches the receiver of the communication unit Komm, but not in a direct way. A possible reason is that an object, in particular a wall, is located between the further firefighter Fw.1, Fw.2, Fw.3 with the transmitter UWB.1, UWB.2, UWB.3 and the firefighter Fw with the communication unit Komm and UWB signals or BLE signals cannot penetrate this object. It is also possible that UWB signals or BLE signals from a transmitter UWB.1, UWB.2, UWB.3 reach the receiver of the communication unit Komm, but are reflected at least once on their way from the transmitter UWB.1, UWB.2, UWB.3. In both cases, the firefighter Fw.1, Fw.2, Fw.3 is not in sight of the firefighter Fw.

In a preferred embodiment, the signal processing unit Sv can distinguish whether the radio waves and thus the signals from a transmitter UWB.1, UWB.2, UWB.3 reach the receiver of the communication unit Komm by a direct path or have been reflected at least once. Only in the first case, the distance (as a direct straight line) between the firefighter Fw.1, Fw.2, Fw.3 and the firefighter Fw is equal to the distance covered by the radio waves. Only in the first case, the signal processing unit Sv uses the distance determined by evaluating the signal or the exchange of signals.

In a preferred embodiment, the communication unit Komm comprises several antennas. In this case in particular, the signal processing unit Sv is able to measure not only the respective distance to a transmitter UWB.1, UWB.2, UWB.3, but also the direction from which the receiver received the signal from the transmitter UWB.1, UWB.2, UWB.3, i.e. an angle. This angle describes at least the angle of a line from the transmitter UWB.1, UWB.2, UWB.3 to the receiver of the communication unit Komm in a horizontal plane, i.e. a 2D angle. In some embodiments, it is possible for the signal processing unit Sv to determine an angle in a local three-dimensional coordinate system from the signals received by the receiver Komm from the transmitters UWB.1, UWB.2, UWB.3. The 2D angle or 3D angle refers to a reference axis, whereby this reference axis has a fixed position and orientation relative to the receiver of the communication unit Komm and moves with the mobile sensor arrangement through the building, e.g. to the viewing direction Br of FIG. 3.

It is also possible that the signal processing unit Sv determines a 2D angle from the signals from the transmitters UWB.1, UWB.2, UWB.3 and also the difference between the height above a horizontal plane. To determine this height difference, the fact that the levels in a building are usually arranged horizontally is exploited and then, when the radio waves from a transmitter UWB.1, UWB.2, UWB.3 reach the receiver of the communication unit Komm by a direct path, the two firefighters Fw.1, Fw.2, Fw.3 are on the same horizontal level. By evaluating infrared images, it can be determined in many cases whether the two firefighters are standing or one is in a kneeling or crouching position. The 2D angle and the height difference result in a 3D angle.

Figure 4:
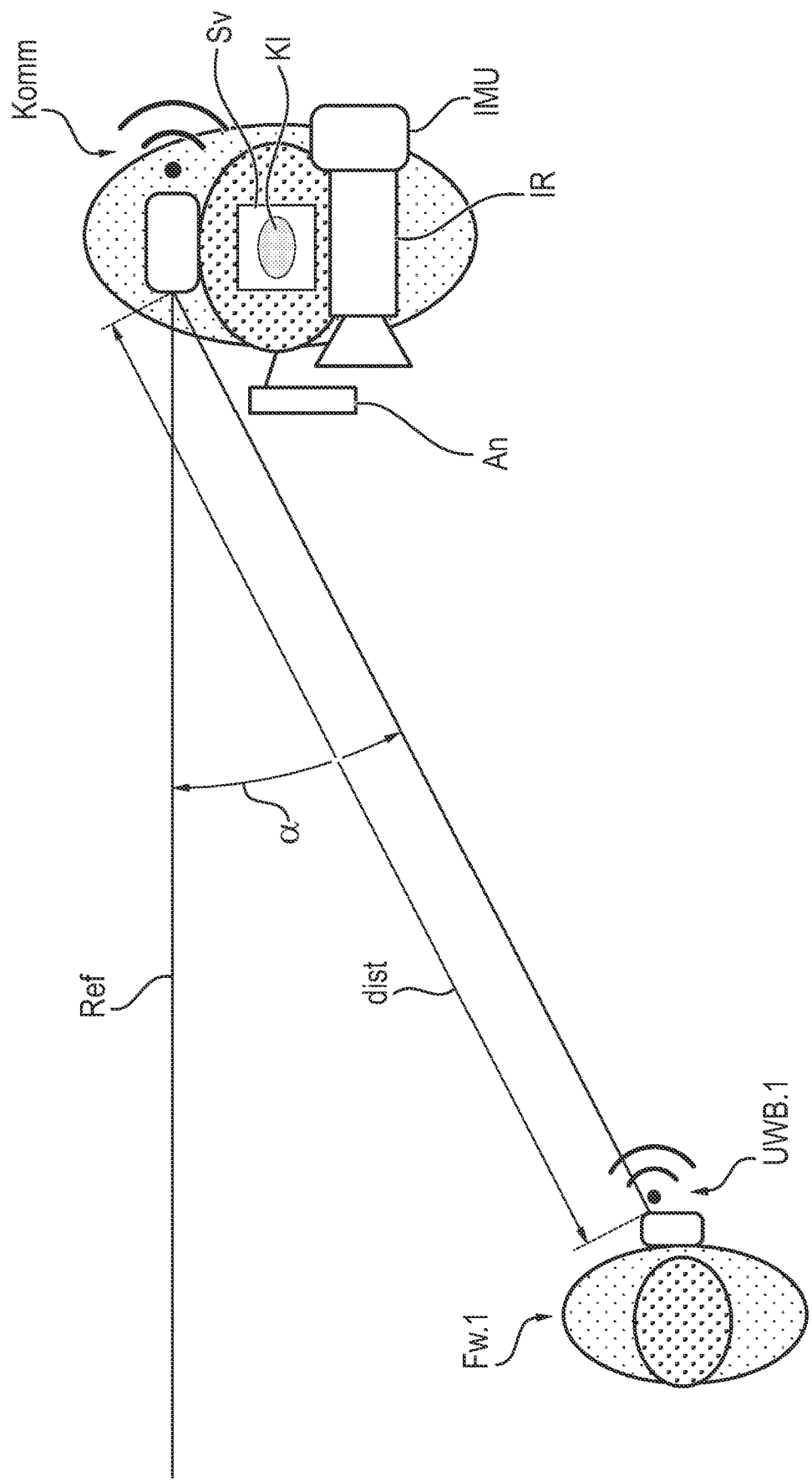
FIG. 4 is a schematic view showing the distance between the receiver of the communication unit and a transmitter, and the angle between a reference axis and a line between the receiver and the transmitter.

FIG. 4 shows an example of the distance dist between the receiver of the communication unit Komm and the transmitter UWB.1 of another firefighter Fw.1 as well as the angle α. The angle α occurs between the reference axis Ref of the mobile sensor arrangement and a line to the transmitter UWB.1.

As just described, each transmitter UWB.1, UWB.2, UWB.3 emits a signal. This signal reaches the receiver of the communication unit Komm at least when there is a direct line of sight. In one embodiment, each transmitter UWB.1, UWB.2, UWB.3 comprises a unique identifier. In one embodiment, this identifier distinguishes transmitter UWB.1, UWB.2, UWB.3 from any other transmitter used by that fire unit. In another realization form, this identifier distinguishes the additional firefighter Fw.1, Fw.2, Fw.3 currently wearing this transmitter UWB.1, UWB.2, UWB.3 from any other firefighter.

As has just been described, the signal processing unit Sv is capable of determining position information about a transmitter UWB.1, UWB.2, UWB.3, respectively. This position information comprises the distance between this transmitter UWB.1, UWB.2, UWB.3 and the receiver of the communication unit Komm and optionally the 2D angle or the 3D angle. In one embodiment, each transmitter UWB.x (x=1,2,3) is capable of determining position information about another transmitter UWB.y (y=1,2,3, y≠x), said position information comprising the distance between the two transmitters UWB.x and UWB.y and optionally the 2D angle or 3D angle. The transmitter UWB.x is able to transmit this position information via the transmitter UWB.y to the receiver of the communication unit Komm.

Recognize Pictures of Humans in Infrared Images

In this embodiment, the signal processing unit Sv locates any further firefighter Fw.1, Fw.2, Fw.3, at least if there is a line of sight between this further firefighter Fw.1, Fw.2, Fw.3 and the firefighter Fw with the mobile sensor arrangement. Preferably, the signal processing unit Sv also locates further humans in the building.

In one embodiment, the signal processing unit Sv determines the respective current position of each visible further firefighter Fw.1, Fw.2, Fw.3 in a local three-dimensional coordinate system, the infrared camera IR being at the origin of this coordinate system and a predefined reference axis Ref of the infrared camera IR having a fixed orientation in this local coordinate system, cf. FIG. 4. This local coordinate system travels with the infrared camera IR through the building. The reference axis Ref is, for example, equal to or parallel to the viewing direction Br.

The infrared camera IR generates a sequence of images in the infrared range as the firefighter Fw moves through the building. This sequence is called an image sequence. Typically, each infrared image in this sequence shows at least one contour of somebody/something. This somebody/something can be
 an object, in particular a component of the building, for example a window, a door, a wall or an edge of a room, or an item of furniture in the building, for example a table or a bed or a light source, or also
 a human.

This human can be a firefighter, i.e. a person of the group of persons with a transmitter, or a human to be rescued, or even a bystander.

Of course, it is possible that only a part of a human or an object is shown in an infrared image.

An image processing classifier Kl automatically classifies the pictures of objects in the infrared images. The classifier Kl distinguishes at least whether a picture of somebody/something shown in an infrared image shows a human or an object. In a preferred embodiment, contours are detected in the infrared images. The classifier Kl has read access to a computer analyzable library of contours of already classified humans and various objects, and compares the contours of the library with the contours in the infrared images.

Note: An object, for example a window mannequin, as well as a mirror image of a human can have the contour of a human. However, a human has a body temperature that is usually between 36° C. and 38° C., while an object usually has the temperature of its surroundings. A light source sometimes has a temperature well above the body temperature of a human. In the heat tone images of the infrared camera IR, a picture of an object or a picture of a mirror image of a human can therefore in many cases already be distinguished from the picture of a human with sufficient reliability on the basis of the heat tone shown, i.e. on the basis of the temperature.

Generally, many infrared images generated by the infrared camera IR show at least one segment of a floor or at least one segment of a wall of a room. Preferably, the classifier Kl also detects floor segments and wall segments in the infrared images.

In one embodiment, the classifier Kl additionally uses a signal from the optional distance sensor. In one embodiment, the classifier Kl uses a measured distance to a reflective object to scale the picture of that object in an infrared image, i.e., to zoom in or out depending on the distance. The scaled picture is easier to compare with contours in the library because the library needs to include fewer pictures with different mapping scales for the same object than if no scaling were performed.

In another application, the classifier Kl determines the time course of the distance in the viewing direction Br of the infrared camera IR to one reflecting object at a time. The viewing direction Br of the infrared camera IR changes when the firefighter Fw moves through the building or moves that part of his or her protective equipment to which the infrared camera IR is attached. If the infrared camera IR is attached to the protective helmet Hm, the viewing direction Br changes when the firefighter Fw turns his or her head. If there is another object or a human in front of a wall, the distance to the respective object/human in front changes when the viewing direction changes and therefore this other object/human and no longer the wall is in the viewing direction Br, cf. FIG. 3. Conversely, if a contour is detected in an infrared image, but the distance to this contour does not change, this contour may not be the picture of a physical object/human, but only simulates an object/human. For example, the picture shows a mirror image of a human.

Preferably, the classifier Kl is trained in a preceding learning phase. In this learning phase, a learning process is applied to a so-called annotated sample. For example, a neural network is trained with the sample.

This sample comprises a set of computer analyzable infrared images, each infrared image fully or partially showing an area inside a building, furnishings, and/or at least one human. Preferably, some infrared images of the sample do not show any object other than walls and passageways to improve the learning process. The remaining infrared images each show at least one building area and/or human in a wavelength range above 3 µm, i.e., in the wavelength range in which the infrared camera used according to the invention also generates IR images. The infrared images of the sample are or will be annotated in advance. "Annotate" means: in each infrared image of the sample, it is annotated which objects the infrared image shows, a list of possible objects being predefined. Of course, an infrared image of the sample can show several objects and/or an object only partially.

In one embodiment, this sample is also generated using an infrared camera, for example, the IR infrared camera also used for the process, or another infrared camera.

In a preferred embodiment variation, however, the sample used with infrared images in the wavelength range above 3 µm is automatically generated from a predefined initial sample. This initial sample comprises annotated images, each image of the initial sample having been generated with light in the visible wavelength range and also showing at least one area of a building, at least one fixture and/or at least one human. Each image of the predefined output sample is computationally mapped, i.e. converted, to an image in a wavelength range above 3 µm. Both each image of the initial sample and the automatically generated infrared image of the sample used to train the classifier Kl comprise a plurality of pixels, wherein each pixel of an image of the initial sample is assigned a hue value, for example an RGB value, and each pixel of an image of the sample used is assigned a heat tone value.

For the conversion, a typical room temperature as well as a typical body temperature of a human are preferably predefined. In the step of generating an infrared image of the sample used for training from an image of the initial sample, it is determined, based on the annotation in the image of the initial sample, which areas of this image show at least one human and which areas show objects. The pixels of an area showing a human are given a heat tone value depending on the body temperature, the remaining pixels depending on the room temperature.

As explained above, infrared images are displayed on the display unit An on the helmet Hm of the firefighter Fw and optionally on the display unit of another firefighter Fw.1, Fw.2, Fw.3. In each displayed infrared image, each contour that the classifier Kl has classified as a picture of a human or part of a picture of a human is labeled or highlighted. This highlighting makes it easier for the firefighter Fw, Fw.1, Fw.2, Fw.3 to distinguish this contour of a human from the contour of an object.

The classifier Kl takes a period of time to examine an image from the infrared camera IR for pictures of humans. In one embodiment, the classifier Kl begins examining an image when the classifier Kl has completed examining an image taken earlier. Thus, the classifier Kl then continuously evaluates images. In another embodiment, the step that the receiver of the communication unit Komm has received a signal from a transmitter UWB.1, UWB.2, UWB.3 triggers the step that the classifier Kl evaluates an image of the infrared camera IR. This image was generated at the time when the receiver of the communication unit Komm received the signal, and is, for example, the image that was generated last in this period, or the most recent image. It is therefore possible that the classifier Kl only evaluates an image if this image was generated while the receiver was receiving a signal. This makes the classifier Kl less busy than if it were continuously evaluating images. A mixture of these two embodiments is also possible. For example, the classifier Kl then evaluates the most recent image again if a predefined period of time has elapsed since the last evaluation of an image during which the classifier Kl has not evaluated any image, or if the camera IR has performed a sufficiently large linear movement and/or angular movement since the last evaluation.

Distinguishing Firefighters from Other Humans

According to the embodiment described below, the classifier automatically decides, with higher reliability than conceivable other processes, whether a region of an infrared image is or comprises a picture of another firefighter Fw.1, Fw.2, Fw.3, a picture of another human or a picture of an object.

Each infrared image is displayed on the display unit An, which is carried by the firefighter Fw. In this displayed infrared image, the picture of another firefighter Fw.1, Fw.2, Fw.3 is identified and thereby distinguished from the picture of any other human. In the following, embodiments are described how the classifier Kl makes this distinction.

It is possible that the classifier Kl cannot classify a contour in an infrared image as a picture of a firefighter or as a picture of another human or object, with a sufficiently high degree of certainty by image evaluation alone, i.e. cannot distinguish between these two situations with sufficient certainty. A picture of a human in an infrared image can show a firefighter (person) or a human to be rescued or a bystander, possibly also a mirror image of a human. The invention makes it possible, but eliminates the need, to distinguish the picture of another firefighter Fw.1, Fw.2, Fw.3 from a picture of any other human by image evaluation based on the protective equipment shown. The image evaluation that would be required for this is relatively computationally time consuming. Furthermore, such an image evaluation requires that the classifier Kl is trained with pictures of firefighters in different protective equipment and body postures.

As just explained, the signal processing unit Sv is able to determine the respective distance dist between itself and a transmitter UWB.1, UWB.2, UWB.3, optionally also the respective 2D angle or respective 3D angle of a distance between the receiver of the communication unit Komm and the transmitter UWB.1, UWB.2, UWB.3. If the signal processing unit Sv has determined the information that a transmitter UWB.1, UWB.2, UWB.3 is located at a certain distance, this information results in the information as to how large a picture of the corresponding further firefighter Fw.1, Fw.2, Fw.3 is in an image and thus also in an infrared image. Based on this information, it can often be decided with certainty whether an image shows a further firefighter Fw.1, Fw.2, Fw.3 or another human or object. In particular, it can often be ruled out with a high degree of certainty that the image shows a firefighter based on the determined distance dist as well as the current viewing direction Br of the camera IR.

Image processing is possible, but not required, in which the picture of a firefighter is distinguished from a picture of any other human on the basis of the protective equipment shown in the image. If the receiver of the communication unit Komm has currently received no signal at all from a transmitter UWB.1, UWB.2, UWB.3 or if this signal has not reached the receiver directly from the transmitter UWB.1, UWB.2, UWB.3, then the picture in the image of the camera IR cannot, as a rule, show another firefighter Fw.1, Fw.2, Fw.3.

So, according to the embodiment just described, the signal processing unit Sv uses the distance between the firefighter Fw with the communication unit Komm and another firefighter Fw.1, Fw.2, Fw.3 with a transmitter UWB.1, UWB.2, UWB.3 to detect a picture of another firefighter Fw.1, Fw.2, Fw.3 in an infrared image. The embodiment of using distance dist in addition to image processing has the following advantage: reflective surfaces may be present in the building, for example mirrors, cabinets, or reflective walls. Such a reflective surface may show the mirror image of another firefighter Fw.1, Fw.2, Fw.3. However, the picture of the mirror image should in many cases be distinguished from the picture of the real further firefighter Fw.1, Fw.2, Fw.3. Often, the determined distance dist already makes it possible to make this distinction. The distance between the receiver of the communication unit Komm and the transmitter UWB.1, UWB.2, UWB.3 is measured. In many cases, this distance dist deviates significantly from the distance between the receiver and the mirror image, so that the picture of the mirror image has a different size in an infrared image than the picture of the real firefighter Fw.1, Fw.2, Fw.3. In many cases, this already makes it possible to distinguish the picture of the mirror image from the picture of the real firefighter.

If the signal processing unit Sv can additionally determine the angle, it is also known from which direction the receiver Komm has received a signal from a transmitter UWB.1, UWB.2, UWB.3. The information about the direction increases the reliability with which a picture of another firefighter Fw.1, Fw.2, Fw.3 can be identified in infrared images. In particular, the information about the direction increases the reliability with which a picture of a mirror image can be distinguished from a picture of another firefighter Fw.1, Fw.2, Fw.3.

As just explained, in one embodiment the signal processing unit Sv is able to determine the distance and the angle, i.e. the direction to a transmitter UWB.1, UWB.2, UWB.3. The classifier Kl combines the distance and the direction with the orientation signal of the inertial sensor unit IMU. By evaluating the orientation signal, the classifier determines the current viewing direction Br of the infrared camera IR. Depending on the current viewing direction Br of the infrared camera IR as well as the 2D angle or 3D angle to a transmitter UWB.1, UWB.2, UWB.3, the classifier decides whether the additional firefighter Fw.1, Fw.2, Fw.3 is currently in the field of view Bf of the infrared camera IR or not. For this purpose, the classifier Kl additionally uses the information about how large the angle of view of the field of view Bf of the infrared camera IR is. Only if the further firefighter Fw.1, Fw.2, Fw.3 is currently in the field of view Bf of the infrared camera IR, the current infrared image can show a picture of this further firefighter Fw.1, Fw.2, Fw.3. This embodiment further increases the reliability with which the classifier Kl decides whether or not an infrared image shows another firefighter Fw.1, Fw.2, Fw.3.

A possible embodiment has already been described in which the signal processing unit Sv is able to receive position information from a transmitter UWB.x via a further transmitter UWB.y (y≠x). This position information comprises the distance between the transmitters UWB.x and UWB.y and, in one embodiment, additionally the information whether the signal reaches the receiver Komm by a direct path or has been reflected at least once. In many cases, the signal processing unit Sv is able to use this additional position information for a plausibility check. For example, if there is a line of sight between the firefighter Fw and two other firefighters Fw.x and Fw.y (y≠x) respectively, the signal processing unit Sv is able to determine three distances according to this embodiment, namely the distance between Fw and Fw.x, between Fw and Fw.y, and between Fw.x and Fw.y. These three distances are the three side lengths of a triangle. This property can be used for a plausibility check. In particular, an incorrect determination of a distance can be detected automatically.

In an embodiment already described, each transmitter UWB.1, UWB.2, UWB.3 comprises a unique identifier. This identifier facilitates the signal processing unit Sv to distinguish the received signals from two different transmitters, even if these two transmitters UWB.1, UWB.2, UWB.3 have the same distance to the communication unit Komm within the measurement accuracy. In particular, the signal processing unit Sv is able to automatically distinguish the case when two other firefighters Fw.1, Fw.2, Fw.3 are in line of sight and at the same distance from the firefighter Fw from the case when only one other firefighter Fw.1, Fw.2, Fw.3 is in line of sight with the firefighter Fw. Furthermore, the embodiment with the identifiers increases the reliability that the signal processing unit Sv is able to distinguish two further firefighters Fw.1, Fw.2, Fw.3 from each other, even if in an infrared image the two pictures of these further firefighters Fw.1, Fw.2, Fw.3 overlap.

The application just described uses, on the one hand, infrared images generated by the infrared camera IR, and, on the other hand, signals received by the communication unit Komm and processed by the signal processing unit Sv. In the embodiment, the infrared camera IR and the inertial sensor unit IMU are attached to the protective helmet Hm of the firefighter Fw and therefore cannot move relative to each other. The communication unit Komm, on the other hand, is attached to another component of the protective equipment of the firefighter Fw, for example to the carrying plate Pl, and can therefore move relative to the inertial sensor unit IMU. Therefore, the position of the communication unit Komm may change in the local coordinate system just mentioned, in the origin of which the infrared camera IR is located.

Figure 5B:
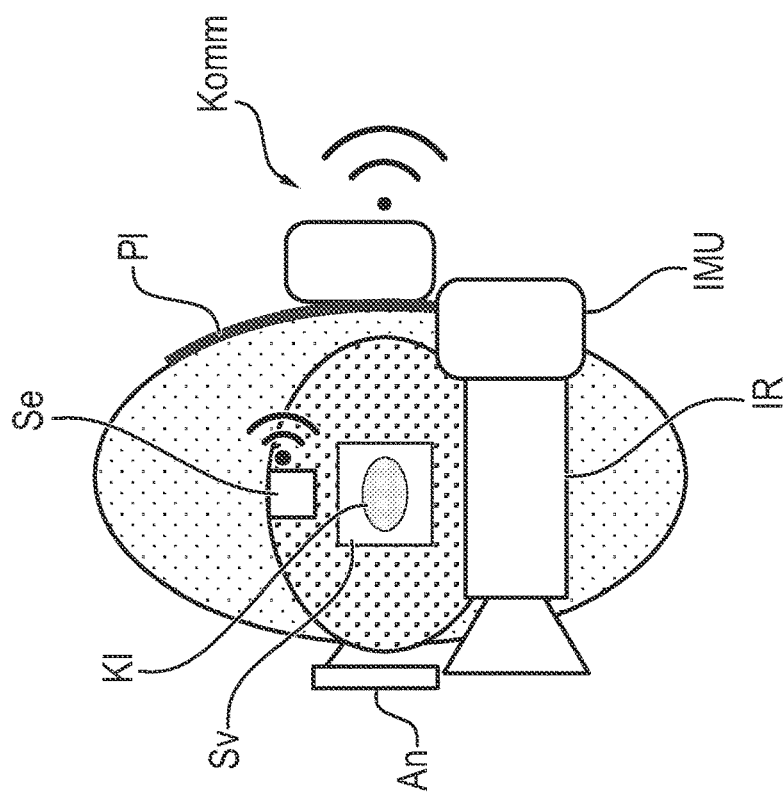
FIG. 5b is a schematic view showing another implementation of how the position of the communication unit is determined relative to the infrared camera.
Figure 5A:
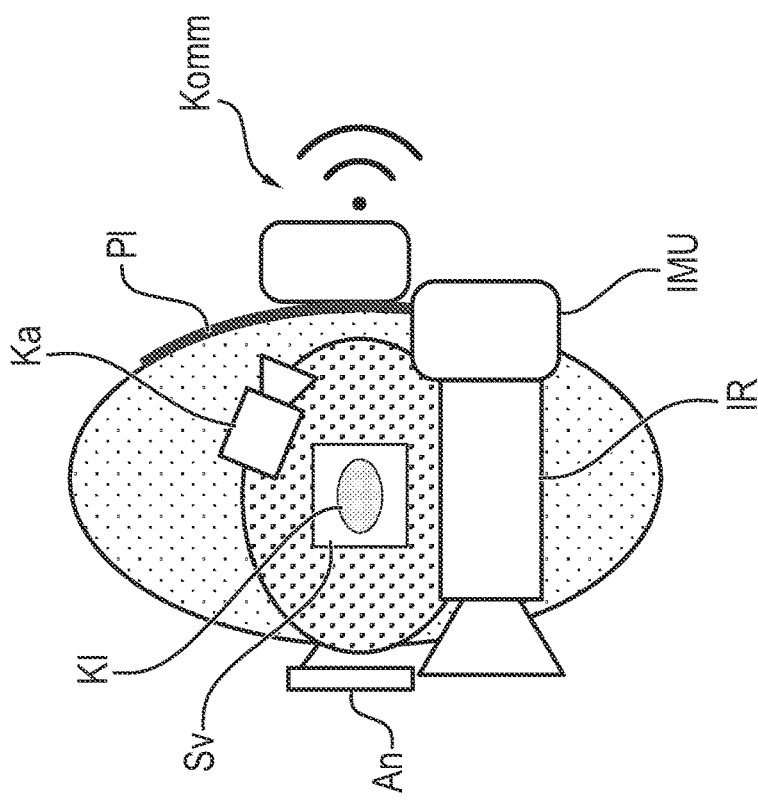
FIG. 5a is a schematic view showing an implementation of how the position of the communication unit is determined relative to the infrared camera.

In one embodiment, this relative movement is neglected. This is justified in some cases because the distance between the protective helmet Hm and the carrying plate Pl remains less than 1 m as long as the firefighter Fw does not take off the protective helmet Hm. In another embodiment, this relative movement is determined. FIG. 5 *a*) and FIG. 5 *b*) show two possible implementations to determine this relative movement. According to the implementation of FIG. 5 *a*) a camera Ka is mounted at the protective helmet Hm. This camera Ka determines the position and orientation of the carrying plate Pl relative to itself and thus relative to the protective helmet Hm. It is also possible that the camera Ka is mounted on the carrying plate Pl and determines the position and orientation of the protective helmet Hm relative to the carrying plate Pl. According to the realization form of FIG. 5 *b*), a transmitter Se is mounted on the protective helmet Hm of the firefighter Fw. The optional transmitter Se belongs to the mobile sensor arrangement and is moved through the floor Et together with the mobile sensor arrangement. A low transmit power of the transmitter Se is sufficient, and preferably the transmitter Se transmits a signal anisotropically towards the carrying plate Pl. The receiver of the communication unit Komm receives the signal from the transmitter Se. In both embodiments, the distance between the communication unit Komm and the infrared camera IR and optionally the direction of a path between these two devices Komm, IR are determined.

As explained above, pictures of other firefighters Fw.1, Fw.2, Fw.3 as well as pictures of other humans are automatically detected in the infrared images. In one application, the infrared images are displayed on the display unit An, which is attached to the protective equipment of the firefighter Fw, preferably to his or her protective helmet Hm. In these displayed infrared images, each displayed picture of another firefighter Fw.1, Fw.2, Fw.3, as well as each displayed picture of any other human is highlighted. If the signals from the three transmitters UWB.1, UWB.2, UWB.3 include unique identifiers, then preferably these identifiers are also shown on the display unit An.

Figure 6:
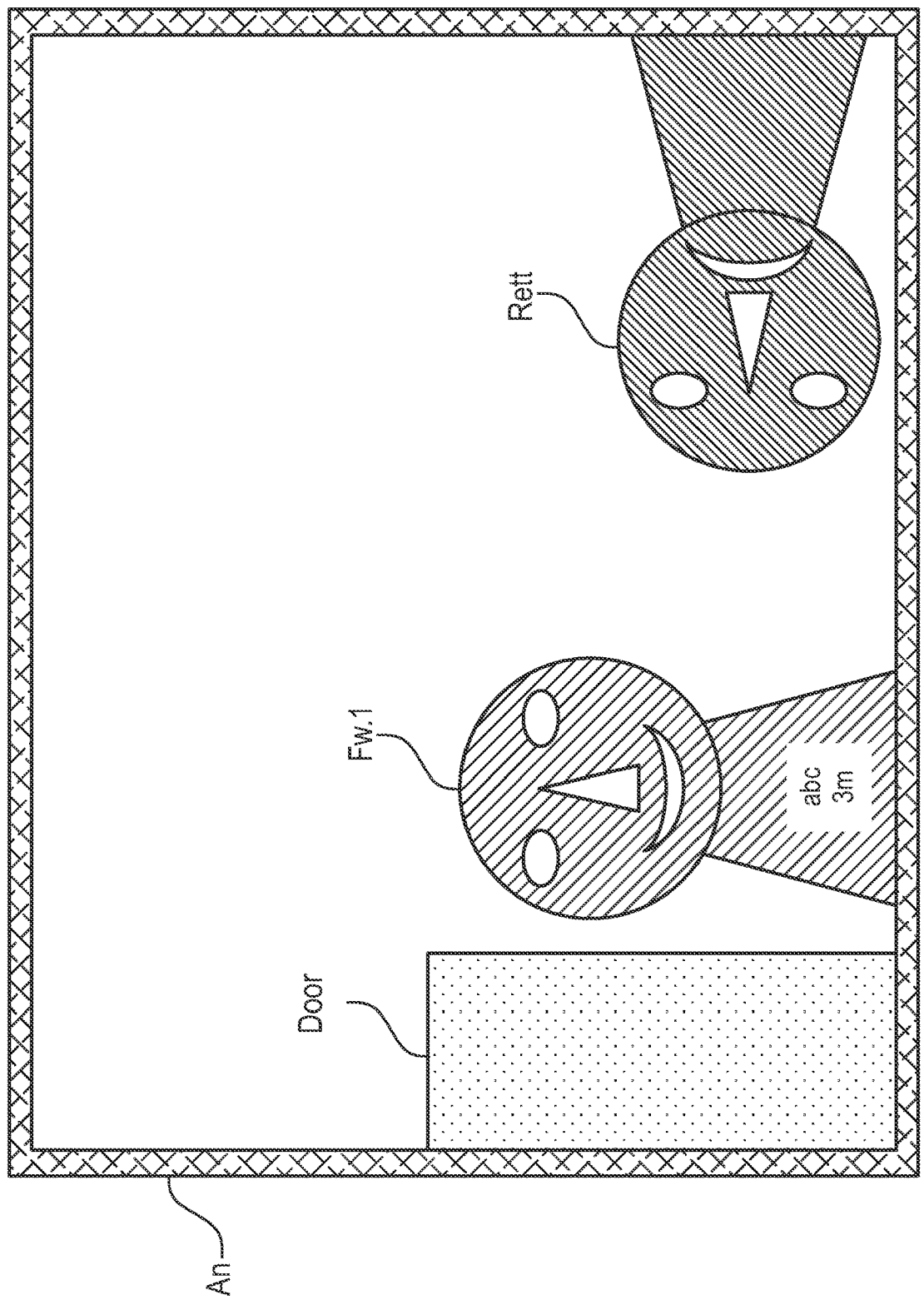
FIG. 6 is a schematic view showing an exemplary display unit on which a picture of a firefighter and a picture of a human to be rescued are displayed.

FIG. 6 shows an example of what is displayed on the display unit An, which is attached to the helmet Hm of the firefighter Fw. On the display unit An, a first picture showing a part of the firefighter Fw.1, a second picture showing a part of a human to be rescued Rett, and a picture of a door (Door) are displayed. In the first picture, an identifier abc of the firefighter Fw.1 and the determined distance of 3 m between the transmitter UWB.1, which is attached to the protective equipment of the firefighter Fw.1, and the receiver Komm are displayed.

Track Movements of Additional Firefighters

In some cases, an initial attack squad has a requirement that at least two firefighters be in a room together at all times, i.e., not one firefighter alone in a room. The design described below supports compliance with this requirement.

In one embodiment, the signal processing unit Sv detects the event that the receiver of the communication unit Komm has received a signal from a transmitter UWB.1, UWB.2, UWB.3 at a first time, but no such signal at a subsequent second time. Or at the first time the signal reached the receiver directly (as a direct straight line) from the transmitter, but at the second time the signal was reflected at least once. This event means in many cases that the further firefighter Fw.1, Fw.2, Fw.3 was at the first time in the same room as the firefighter Fw with the mobile sensor arrangement, but at the second time not or at least not in a line of sight with the firefighter Fw. In one embodiment, in this case the mobile sensor arrangement causes a corresponding message to be output in a form that can be perceived by a human.

In one embodiment, the signal processing unit Sv is capable of tracking the position of another firefighter Fw.1, Fw.2, Fw.3, wherein said another firefighter Fw.1, Fw.2, Fw.3 is located in the same space as the firefighter Fw with the mobile sensor arrangement during a time period. In a first time period of the time period, the further firefighter Fw.1, Fw.2, Fw.3 is in the field of view Bf of the infrared camera IR, and the receiver of the communication unit Komm receives a signal from the transmitter UWB.1, UWB.2, UWB.3 of the further firefighter Fw.1, Fw.2, Fw.3. The picture of the further firefighter Fw.1, Fw.2, Fw.3 is highlighted in a representation of the infrared images generated by the infrared camera IR in the first time period, optionally with the identification of this further firefighter Fw.1, Fw.2, Fw.3, The receiver also receives a signal from this transmitter UWB.1, UWB.2, UWB.3 in a second time period of the time period. However, the further firefighter Fw.1, Fw.2, Fw.3 is not in the field of view Bf of the infrared camera IR in the second time period. In many cases, the signal from the transmitter UWB.1, UWB.2, UWB.3 makes it possible to detect a picture of the further firefighter Fw.1, Fw.2, Fw.3 in infrared images taken in a subsequent third time period of the time period.

In a further implementation of this embodiment, the fact that the further firefighter Fw.1, Fw.2, Fw.3 moves relative to the firefighter Fw with the mobile sensor arrangement usually not abruptly but gradually is exploited. The signal processing unit Sv obtains from the signal from the transmitter UWB.1, UWB.2, UWB.3 of the further firefighter Fw.1, Fw.2, Fw.3 the time course of the distance between the transmitter and the receiver Komm. This distance usually does not change abruptly either. This time course of the distance as well as optionally the orientation signal and the movement signal from the inertial sensor unit IMU improves the reliability that the picture of the further firefighter Fw.1, Fw.2, Fw.3 is detected in the infrared images in the third time period.

Supporting the Rescue of Humans

It is possible that there is a human in the building who needs to be rescued. Sometimes a firefighter who finds this human is not able to rescue this human immediately, i.e. to escort or transport him or her out of the building immediately. In this case in particular, the embodiment described below supports the rescue of this human. It is possible that this human is able to rescue himself or herself, i.e. to move out of the building.

According to this embodiment, at least one further, preferably each further firefighter Fw, Fw.1, Fw.2, Fw.3 of the initial attack squad carries at least one further transmitter, i.e. in addition to the transmitter attached to the protective equipment of the further firefighter Fw.1, Fw.2, Fw.3. Also, each further transmitter is able to exchange signals with the communication unit Komm according to the transmission protocol Ultra Wideband (UWB) or to send a signal according to the transmission protocol Bluetooth Low Energy (BLE), and the communication unit Komm of the firefighter Fw is able to determine position information about the transmitter UWB.1, UWB.2, UWB.3 on the basis of the signal exchange or the received signal, respectively. If a firefighter Fw, Fw.1, Fw.2, Fw.3 finds a human to be rescued and cannot rescue them immediately himself or herself, this firefighter Fw, Fw.1, Fw.2, Fw.3 attaches another transmitter to the clothing of this human.

Each signal from a transmitter UWB.1, UWB.2, UWB.3 comprises an identifier which identifies this transmitter at least as a transmitter of a firefighter, optionally a unique identifier of the transmitter itself or of the further firefighter Fw.1, Fw.2, Fw.3 carrying this transmitter. Any signal from a further transmitter includes an identifier that this transmitter can be attached to a human to be rescued and is not associated with a firefighter, i.e. not associated with a person of the group of persons.

The classifier Kl described above detects the pictures of humans in each infrared image. The signal processing unit Sv locates each person with a transmitter UWB.1, UWB.2, UWB.3 or another transmitter and marks the picture of this person in an infrared image, cf. FIG. 6. This marking for the picture contains the information whether this picture shows a firefighter or a human to be rescued, i.e. a human with another transmitter. These infrared images are displayed on a display unit on a protective helmet, in particular on the display unit An. The picture of a human to be rescued in a displayed infrared image makes it easier for a firefighter to find and rescue the human.

Further above advantages of the embodiment were described that each further firefighter Fw.1, Fw.2, Fw.3 carries in each case a transmitter UWB.1, UWB.2, UWB.3 and the mobile sensor arrangement measures continuously the distance between itself and such a transmitter UWB.1, UWB.2, UWB.3. These advantages apply accordingly to the location of a human to be rescued, which has been equipped with another transmitter.

Reliably Find Key Points

While the firefighter Fw is walking through the building with the mobile sensor arrangement, the situation may occur that the firefighter Fw enters a first room, then a second room, and then the first room again. Furthermore, it is possible that the firefighter Fw looks first in a first direction, then in a second direction and then again in the first direction. Both situations result in a first sequence of infrared images showing a first object, in particular a component of the building or a fixture object, optionally from different viewing directions. A subsequent second sequence of infrared images does not show this object. A subsequent third sequence of infrared images shows this object again.

The following embodiment increases the certainty that the picture of the same object is recognized in the infrared images of the third sequence, i.e., is recognized as a picture of an object already shown in the infrared images of the first sequence. The task of automatically detecting that an area of a building that has already been scanned is being scanned again has also become known as "Visual Simultaneous Localization and Mapping" (Visual SLAM), but so far not for the applications described here.

The infrared images are searched for characteristic visual features. Such characteristic features are also called landmarks. A characteristic feature in an image, and thus in an infrared image, is an area of the image with characteristic properties. An example of a characteristic feature is an image area showing the intersection of at least two edges of a room of the building, i.e. a corner point (vertex) in the room. A characteristic feature, in particular a corner point, has the property that the characteristic feature can be automatically recognized with a relatively high degree of certainty in different images, even if these images show the characteristic feature from different viewing directions and/or from different distances and therefore with different imaging scales. In many cases, a process based on such characteristic features, especially corner points, is robust against rotations and translations.

To detect corner points, in one implementation form, the process described in J. Shi & C. Tomasi: "Good Features to Track", IEEE 19/94, pp. 1063-1069.

Key points are extracted from the characteristic features in the infrared images. A key point is a set of image points with characteristic features. If two different infrared images show the same key point, optionally from different viewing directions, it is automatically decided that these two infrared images show the same room of the building. Of course, it is possible that the two infrared images show different areas of this room.

According to the embodiment, characteristic features and then key points are detected in several immediately successive infrared images, whereby these characteristic features and key points originate from the same object and can ideally be clearly identified visually. Thanks to the key points and the motion signal, it is possible to automatically detect the respective position and orientation of the infrared camera IR relative to these key points and thus relative to a room of the building. This position and orientation refers to an infrared image and can of course vary from infrared image to infrared image. In many cases, it is possible to derive the respective position and orientation of the infrared camera IR in the global three-dimensional coordinate system.

If the same key point has been detected in at least two different infrared images, triangulation is preferably performed to determine the respective position and movement of the infrared camera IR.

In one realization form, to detect key points, image points with certain features are searched in each infrared image. In a preferred realization form, to find these image points, the detector AGAST is applied. This detector for finding corner points is described in E. Mair, G.-D. Hager, D. Burschka, M. Suppa & G. Hirzinger: "Adaptive and generic corner detection based on the accelerated segment test", European Conf. on Computer Vision, September 2010, pp. 183-196, Springer.

Preferably, each infrared image is first computationally blurred. Preferably, a "box blur" is applied for this purpose. A box blur is a low pass filter where all elements of the kernel matrix equal 1. Blurring computationally removes all or at least some of those lines which are generated by noise, i.e. which do not show a real edge. Such lines generated by noise often "travel" with the infrared camera IR and can distort results. After blurring, the detector is significantly less affected by the remaining unavoidable noise.

Preferably, each infrared image is linearly normalized after blurring, namely around the minimum and maximum. A special embodiment of the normalization is described below. In the application described here, corner points are searched in infrared images, preferably in blurred and normalized infrared images.

For technical reasons, infrared images, i.e. images from thermal imaging cameras, have more static noise than images in the visible range. The noise can result in at least one line in an infrared image that is mistaken for an edge of an object. Such a noise-generated line can cause points in infrared images to be mistaken as key points.

To reduce the influence of the unavoidable static noise, a reference image is generated. For this purpose, in an optional embodiment, a sequence of infrared images of a homogeneous surface is acquired. Each infrared image of the sequence is linearly normalized, and subsequently the reference image is determined as an averaging over the normalized infrared images of the sequence.

The picture of a heat source in an infrared image is very different from the pictures of the other displayed areas. The infrared camera IR generates a sequence of infrared images as the firefighter Fw walks through the building with the infrared camera IR, often turning his or her head, which changes the direction of view Br of the infrared camera IR. Therefore, it may happen that an infrared image shows a heat source, while the infrared image taken immediately before or after it does not show a heat source.

To avoid an abrupt change between the heat tone values of two successive infrared images of the sequence and thus an abrupt change of the contrast, the infrared images are not normalized individually. Rather, a temporal sequence of infrared images is normalized linearly. For example, the most recently acquired infrared image is always linearly normalized. In the following, M(n) denotes the modal value and N(n) the normal value of the infrared image n. The modal value M(n) of an infrared image is understood to be the most frequently occurring temperature value of the infrared image n. The normal value N(n) is a kind of average or mean or median of the temperature values of the infrared image n, where the normal value N(n) is calculated iteratively.

The modal value M(1) of the first infrared image is determined. The modal value M(1) is used as the normal value N(1) of the first infrared image. For each further infrared image a normal value N(n) for the infrared image number n (n>=2) is calculated step by step in a realization form, preferably according to the calculation rule N(n)=N(n−1)+φ[M(n)−N(n−1)].

The function φ is predefined, for example φ(x)=α*x with a predefined constant. The constant α is smaller than 1, for example α=0.01. This calculation rule reduces variances in the sequence of infrared images. It is also possible to use another calculation rule to calculate the normal value N(n), also a calculation rule that depends on the last m infrared images, where m>1.

Then, the normal value N(n) of an infrared image n is used to linearly normalize the infrared image n as follows: A temperature range is placed around the normal value N(n), and all heat tone values of the infrared image n are mapped to a fixed range of values using this temperature range. In one realization form, a constant K is predefined, and the temperature range for the infrared image n is the interval from N(n)−K to N(n)+K. For example, the possible range of values for the heat tone values is the range from 0 to 255. A heat tone value less than or equal to N(n)−K is mapped to 0, a heat tone value greater than or equal to N(n)+K is mapped to 255, and linear interpolation is performed in between. A heat tone value equal to N(n) is mapped to 127.

The effect of this calculation step with normalization is: The procedure adapts itself to the ambient temperature, which can change rapidly in time and/or location, especially in a building. Because a moving average is formed, abrupt fluctuations of the heat tone values in a sequence of infrared images are avoided. Such abrupt fluctuations could occur with image-by-image linear normalization. The detection and tracking of key points is more robust thanks to the design with normalization. Because abrupt fluctuations in temperature values are avoided, key points can be better detected and tracked throughout the sequence of infrared images.

As just explained, a sequence of infrared images is linearly normalized. Each infrared image is mapped to a fixed temperature range around the normal value, where this normal value is around some kind of average temperature and was determined as described above.

In one embodiment, measured values from the distance sensor are also used. The distance sensor is able to measure the distance between itself and a fixed object, for example a wall. This distance as well as the orientation of the infrared camera IR in space can be used to improve the reliability in detecting key points. The orientation is measured using the motion signal from the inertial sensor unit IMU.

FIG. 7 shows detected key points S.1, S.2, . . . in two different infrared images. Most of the key points shown there are image points which are classified as corner points. However, a key point can also be another point whose surroundings show a characteristic pattern and can therefore be recognized in several infrared images. These two infrared images were taken in the same room from approximately the same viewing angle. However, the infrared camera IR was in a different room between the two times when the two images were taken. It can be seen that some of the same key points and some different key points were detected in the two images.

As already explained, a global, i.e. stationary, three-dimensional coordinate system is used. Preferably, the detected key points are projected into this three-dimensional coordinate system. For the projection, in one embodiment, an approach described in T. Qin, P. Li & S. Shen: "Vins-mono: A robust and versatile monocular visual-inertial state estimator", IEEE Transactions on Robotics, 34(4), 2018, pp. 1004-1020, is used.

In the previous sections, it was explained how key points are detected in the infrared images. In particular, for applications described below, it is necessary that a key point remains stationary, i.e., does not move relative to the rest of the building. Further above it was explained how contours of humans are detected in the infrared images, including contours of further firefighters Fw.1, Fw.2, Fw.3 using tracking units carried by the further firefighters Fw.1, Fw.2, Fw.3, and optionally contours of humans to be rescued who have been provided with further transmitters. Often the classifier Kl In the images is also able to detect pictures of humans without a transmitter.

Preferably, in the step of searching for key points in an infrared image, any region that fully or at least partially shows a human is omitted. In one embodiment, such an omitted area is surrounded by the contour of the picture of a human. In another embodiment, the area is defined by placing a rectangle or other geometric shape around the contour.

In one embodiment, such an area is omitted only if it is reasonably certain to show a human. Conversely, in another embodiment, key points are searched for in an area of an infrared image only if that area does not with sufficient certainty include a picture of a human or part of a human.

Reflective surfaces may be present in the building, for example mirrors, cabinets, or reflective walls. These reflections can simulate the presence of a human in a place where no one is actually present. For example, individual infrared images may show a mirror image of the firefighter wearing the camera that captured those infrared images. The reflections may also fake corner points but are actually caused by moving humans. Not only the picture of a human, but the picture of a reflection of a human in an infrared image has the outline of a human. Therefore, even in an area of an infrared image that shows a mirror image of a human, key points are not searched for. The picture of a human in an infrared image has a heat tone value which corresponds to the body temperature of a human, while the picture of a mirror image of a human has a heat tone value which is usually much lower than the body temperature. The heat tone value of the mirror image depends on the reflectivity and other properties of the reflecting surface.

Determine Trajectory

In one embodiment, the motion signal—signal and the orientation signal, i.e. the time-varying position and orientation of the infrared camera IR in the global three-dimensional coordinate system, are used to determine an approximation for the actual motion path of the infrared camera IR as it moves through the building. The determined trajectory refers to the global three-dimensional coordinate system. The trajectory and thus the trajectory of the infrared camera IR result from the movement of the firefighter Fw through the building as well as from the movements performed by the protective helmet Hm on the head of the firefighter Fw.

Figure 8:
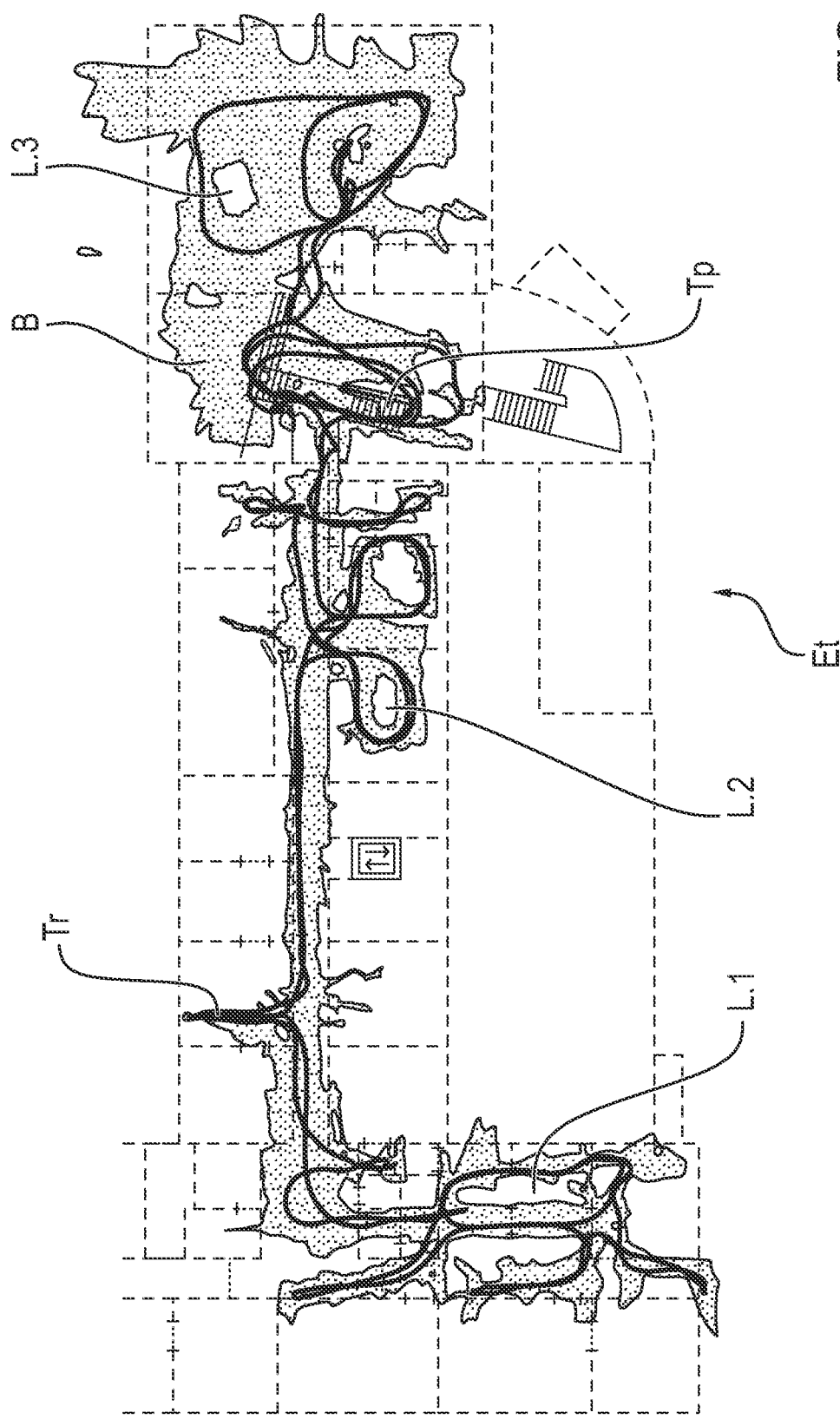
FIG. 8 is a view showing a section of the actual motion path of the infrared camera carried by the firefighter on the floor of FIG. 1 and showing the totality of the detected floor segments.

FIG. 8 shows a section of a trajectory Tr, where the trajectory Tr shows the actual motion path of the infrared camera IR on the floor of FIG. 1. An estimate Tr.3 for this actual motion path trajectory Tr has been generated while the firefighter Fw is carrying the infrared camera IR and the infrared camera IR is generating a sequence of infrared images, cf. FIG. 10. Furthermore, the floor plan shown in FIG. 1 is plotted in FIG. 8. Furthermore, in FIG. 8, the totality of the floor segments detected by the classifier Kl are shown as a gray area B. Several gaps L.1, L.2, . . . can be seen in this totality B. These gaps L.1, L.2, . . . originate from pieces of furniture and other objects in the rooms.

In one embodiment, the trajectory of the infrared camera IR is represented and stored by a so-called pose graph. Each node in this pose graph represents one 6D pose of the infrared camera IR at a sampling time. Such a pose graph is described, for example, in G. Grisetti, R. Kümmerle, C. Stachniss & W. Burgard, "A Tutorial on Graph-Based SLAM," IEEE Intell. Transp. Syst. Mag. 2(4), pp. 31-43, 2010.

An initial pose graph is determined from the orientation signal and the motion signal of the inertial sensor unit IMU. FIG. 9 *a*) shows an example of an initial pose graph in a plane. Each triangle represents a pose Pos.1, Pos.2, . . . , which shows the position and orientation of the infrared camera IR in the plane. This initial pose graph is corrected computationally. For this correction infrared images are used. In these infrared images characteristic stationary areas of the building are recognized, which has been described in more detail above, in particular so-called key points. Such a characteristic building area can be shown in different infrared images, whereby these different infrared images with the characteristic building area can also be distributed over at least two sections of the sequence of infrared images and whereby between these two sections a section can occur in which the characteristic building area is not shown. This means that the firefighter Fw has been in a room, then left the room and then returned to this room.

Figure 9A:
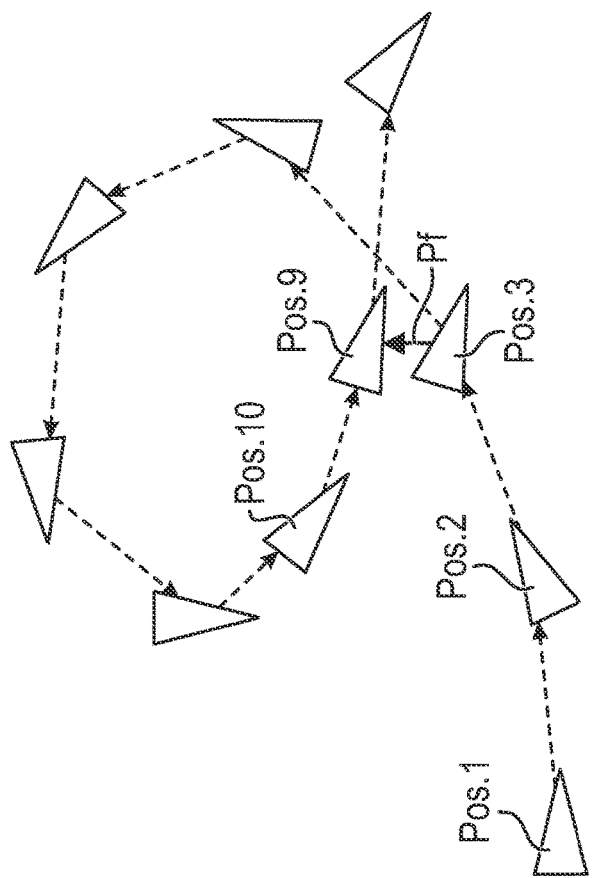
FIG. 9a is a schematic view showing an initial pose graph as an example.
Figure 9B:
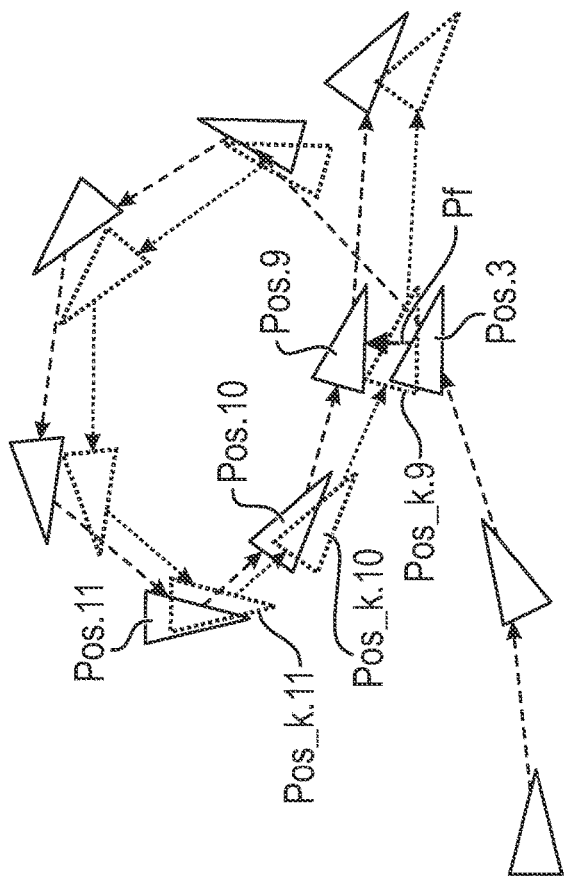
FIG. 9b is a schematic view showing a corrected pose graph as an example.

FIG. 9*b* shows an example of the corrected pose graph which is derived from the initial pose graph of FIG. 9*a*. The initial pose graph is extended by edges between two nodes. Each edge between two nodes represents a spatial constraint between the two represented poses. These constraints are derived from measured values from the inertial sensor unit IMU on the one hand and from the fact that visual features, namely characteristic building areas, are tracked across several infrared images on the other hand. An error function is set up from the nodes and edges and minimized by an optimization procedure. This generates the corrected pose graph from the initial pose graph. The arrow Pf represents the event that at least one building area was recognized for poses Pos.3 and Pos.9. This recognition is used to determine the corrected pose graph with the poses Pos_k.9, Pos_k.10, . . . from the initial pose graph.

The trajectory should describe the actual motion path of the infrared camera IR through the building. The trajectory could have a systematic error, namely due to a vertical drift. This vertical drift results from the fact that measured values of the inertial sensor unit IMU are added or integrated for different sampling times. The motion signal of the inertial sensor unit IMU could therefore have a systematic error resulting in particular from a "build-up" of the measured values. A vertical drift is a systematic and built-up deviation that causes the determined trajectory to be shifted further and further up or down compared to the real motion trajectory of the infrared camera IR. This computational shift is also referred to as "vertical drift".

To compensate this systematic error computationally to a large extent, the fact that a building usually has horizontal and vertical planes, but no inclined plane is exploited. Therefore, a trajectory can be divided into sections, where one section of a trajectory always extends in a horizontal plane and different sections of the trajectory are in two different planes. The event of a trajectory changing from one horizontal plane to another horizontal plane is detected when the relative slope between two poses of the trajectory relative to the overall motion along the trajectory exceeds a predefined threshold. Put another way: The relative slope between two camera poses in the z-direction relative to the overall motion exceeds the predefined threshold.

Figure 10:
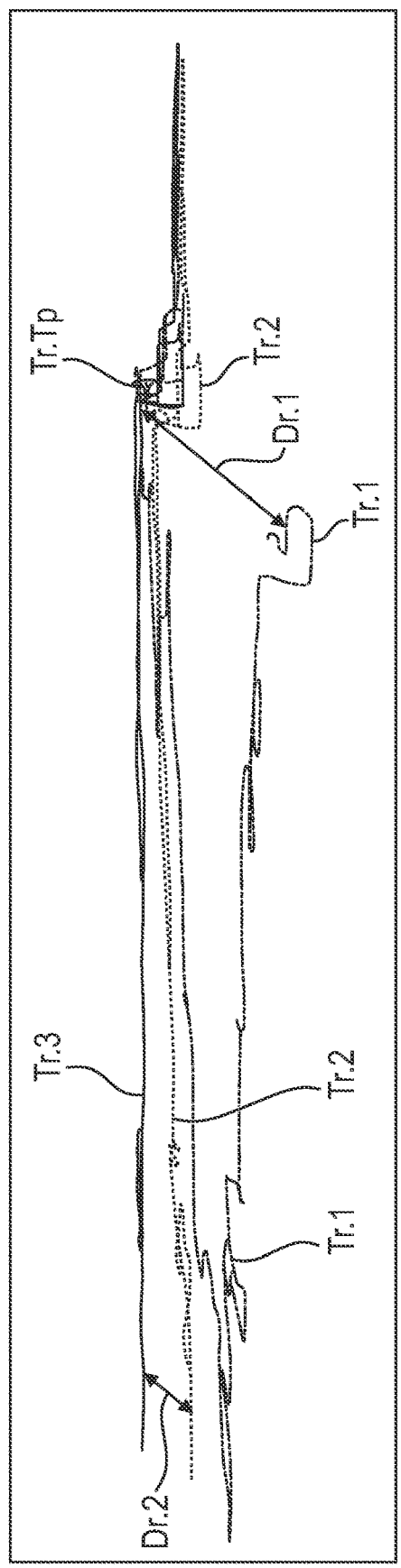
FIG. 10 is a view in a horizontal viewing direction showing the initial trajectory, the intermediate trajectory, and the final trajectory, which are estimates of the actual motion path.

FIG. 10 shows, in an approximately horizontal viewing direction, three different trajectories Tr.1, Tr.2, Tr.3, which are generated one after the other and show with increasing accuracy the movement of the infrared camera IR through the floor of FIG. 1. The firefighter Fw with the infrared camera IR has moved from right to left through the floor of FIG. 1. In all three trajectories, a section Tr.Tp can be seen, which results from the firefighter Fw climbing the stairs Tp.

In a first phase, the key points are detected in immediately successive infrared images, e.g. by the process described in T. Qin, op. cit. This yields the initial trajectory Tr.1. A large vertical drift of the initial trajectory Tr.1 is clearly visible, the drift being indicated by the arrow Dr.1 in FIG. 10. In a second phase, matching key points are detected in spaced sequences of infrared images, and this detects when the firefighter Fw visited the same location for the second time. This leads to the intermediate trajectory Tr.2. This still exhibits a vertical drift indicated by the arrow Dr.2. It is detected that the Tr.Tp section actually comes from a changed height, namely from the staircase Tp, but the rest of the second trajectory Tr.2 extends in the same plane. The intermediate trajectory Tr.2 is shifted into this plane, providing the third and final trajectory Tr.3. This final trajectory Tr.3 is an estimate for the actual motion path Tr shown in FIG. 8.

Determine Floor Plan

As will be explained above, in each infrared image, the classifier Kl classifies the humans and objects shown therein. By this classification, the classifier Kl detects in each infrared image the floor segments and wall segments shown in this infrared image. Preferably, a segment detected in this process with an area that is too small is excluded. Such a small segment can result from an error and is not needed.

Figure 11:
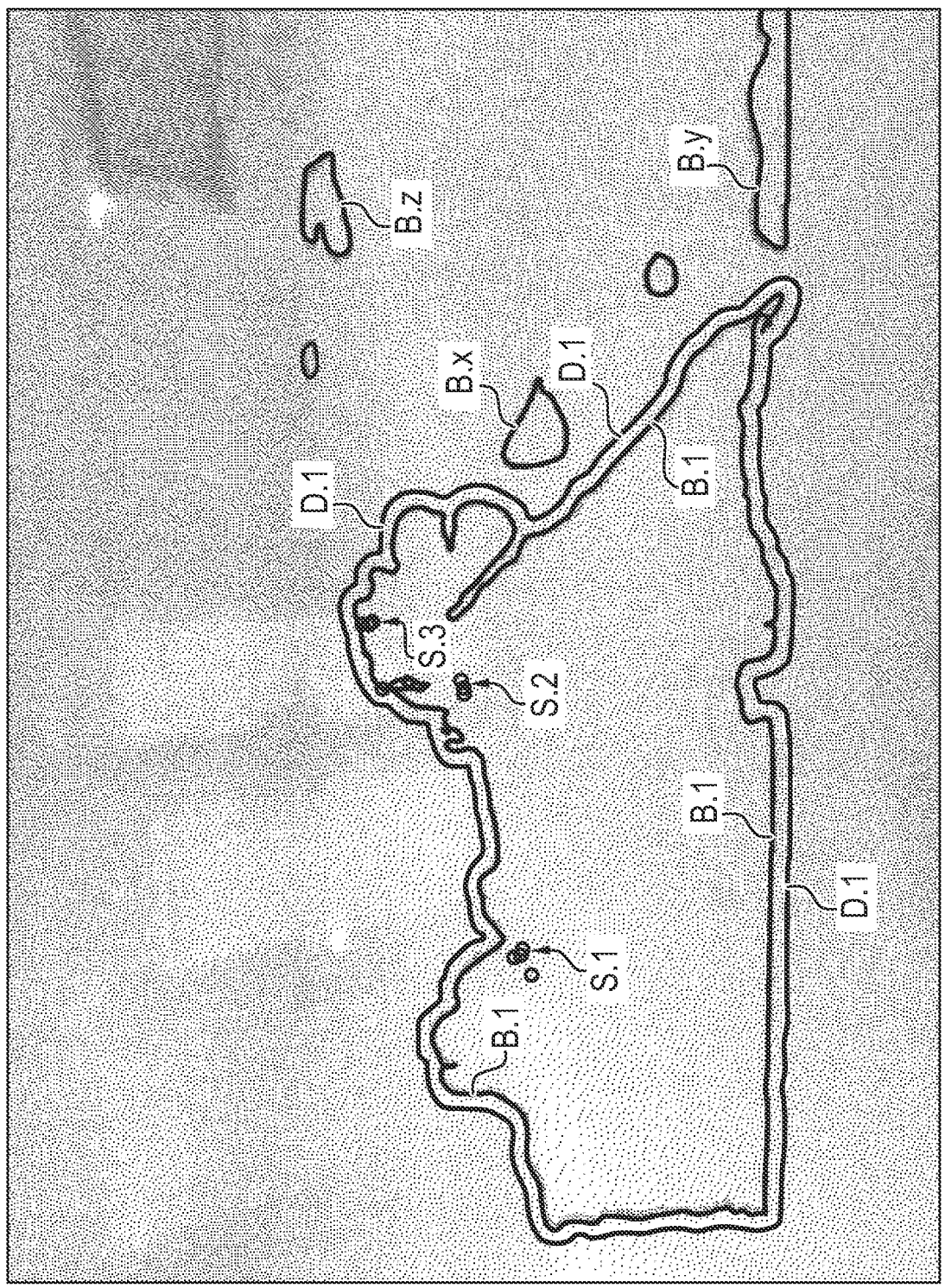
FIG. 11 is a view showing detected key points and floor segments.

FIG. 11 shows an infrared image with detected key points S.1, S.2, . . . (corner points). In addition, a detected floor segment B.1 is shown. The segments B.x, B.y, B.z are not classified as floor segments, in this case because they are too small.

The detected floor segments are then projected and plotted on a grid map. A grid map is a three-dimensional grid with predefined grid points defining predefined cells, preferably cuboids, particularly preferably cubes. In one embodiment, the distance between two adjacent grid points that lie on a line is 10 cm. Again, the assumption is used that a building has only horizontal and vertical surfaces and therefore the floor segments are horizontal. To project the floor segments into the grid map, the trajectory and the respective camera extrinsics and camera intrinsics are used at each sampling time. The camera extrinsics is the 6D pose of the infrared camera IR in space, and the camera intrinsics is the internal projection matrix of the camera lens onto the camera photosensor. This provides one polygon for each floor segment. The polygon is then entered into the cuboids of the grid map, with a cuboid of the grid being marked as occupied if the polygon passes through that cuboid.

In order to be able to correctly project the trajectory and thus the floor segments into the grid map, the respective height of each floor surface in space must be determined beforehand. Each floor segment belongs to such a floor surface. For this purpose, characteristic key points (vertices) are detected in the floor segments. Preferably, the AKAZE (Accelerated KAZE (AKAZE)) detector (AKAZE feature detector) is used for this purpose, which provides a feature vector for each point in the infrared images that can be a key point. This AKAZE feature vector describes the local environment around the candidate key point.

Typically, each characteristic feature, and thus each key point, is shown in several successive infrared images. In one realization form, the key points are localized as follows: The same key point is localized in the last N infrared images. This localization is preferably performed for several different key points. Each key point is associated with a pose of the infrared camera IR at the time it captured the infrared image. The key point is localized by triangulation, matching feature descriptors. In particular, the height of the key point above the ground is determined. Here, the key point is projected into a global three-dimensional coordinate system by triangulation to previously generated images. If a candidate key point is detected in multiple infrared images whose pixel distance, descriptor distance, or Lowe's ratio is above a predefined threshold in each of these images, that candidate is not detected as a key point. This reduces the risk of points inside floor segments being incorrectly detected as key points.

The floor segments are adjacent to wall segments and other vertical segments. More key points are usually detected at a transition between a floor segment and a wall segment or other segment than in an inner area of a floor segment. The most important reason for this is: As a rule, a floor segment is displayed homogeneously in an infrared image, i.e., it has the same temperature value over its entire extent, because the floor segment is made of the same material over its entire area and therefore usually has an approximately equal temperature over its entire extent at one point in time. Before the key points of a floor segment are determined, the transitions between the floor segment and another segment are considered by performing a dilation of the floor segment. During a dilation, borders are made thicker, in particular, a thinner line becomes a thicker line. The reversal of a dilation is a so-called erosion. FIG. 11 shows an example of the dilatation D.1 of the floor segment B.1.

Each projected key point has a height, i.e. a z-coordinate of its position. A floor surface consists of at least one floor segment and is usually surrounded by several key points. The height of a floor segment is calculated as the arithmetic mean or median of the z-coordinates of the key points of this floor segment. Here, a floor segment is discarded and not considered if it has too few key points or if the z-coordinates of these key points differ too much from each other. Possible reasons for this are that points in the infrared images were assigned incorrectly or do not originate from the same floor surface. This averaging of the z-coordinates provides the respective height of each floor segment.

In addition, the estimated heights of the floor segments are normalized over several infrared images. For this purpose, it is first determined in which height planes the trajectory Tr.3 of the infrared camera IR extends. A procedure for this was described above. This procedure provides the respective height from which the infrared image was taken. All floor segments that have been taken from one and the same camera height and are contiguous in the grid ideally have the same height, but in practice have different heights. The height values of these contiguous floor segments are averaged arithmetically or by a median (medianically), and the arithmetic mean/median provides the estimated height that applies to all these floor segments.

Figure 12:
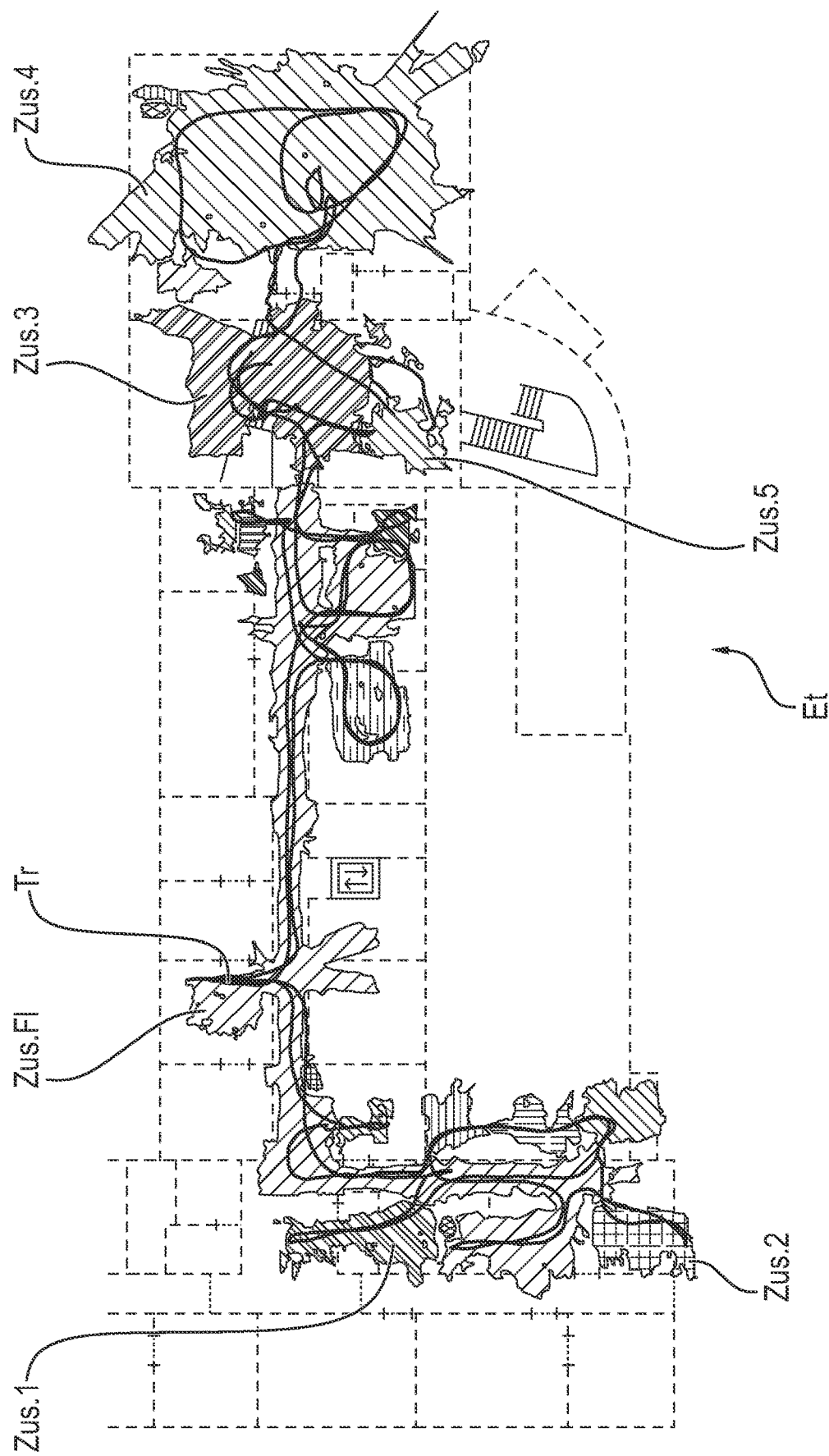
FIG. 12 is a view showing the actual motion path of FIG. 8, the recognized contiguous areas of floor segments, and the floor plan of FIG. 1.

FIG. 12 shows the actual trajectory Tr of FIG. 8 and, for illustration purposes, the ground plan of FIG. 1. In addition, a grid is used, where the distance between two adjacent grid points lying on a line is always 1 m. FIG. 12 further shows that contiguous areas Zus.1, Zus.2, ..., Zus.Fl(Floor) are approximately generated from the floor segments. The gaps L.1, L.2, ... shown in FIG. 8 have been closed. If the contiguous surfaces are generated without errors, each contiguous surface belongs to exactly one rectangular space, and in each rectangular space there is exactly one contiguous surface. In the example of FIG. 12, however, an error has occurred: Two different connected areas Zus.3 and Zus.5 are wrongly assumed, although these two areas belong to one and the same rectangular space. The reason: there is a relatively narrow passage between these two areas of the space.

The procedure described so far provides a grid map in which the floor segments are entered with their respective heights. A room in a building usually has a minimum height. Using this minimum height, several height intervals are predefined in such a way that at most one floor can be located in a height interval. Several floor images E(i) are generated from the grid map. For this purpose, for each predefined height interval, those cells are searched in the grid whose respective height value lies in this height interval. For a height interval either no such cell is found at all, or a multiplicity of such cells is found. Each height interval with a multiplicity of cells whose height values lie in the height interval provides a floor image E(i). Each floor image represents a floor plan of this floor of the building.

To remove small projection errors, a corrected floor image $\underline{E}(i)$ is generated from each floor image E(i) by an erosion (morphological operation). By a first erosion, the edges are shifted orthogonally to the centers of a geometric object. A circle becomes a smaller circle and a frame becomes a thinner frame. Further erosion removes narrow transitions, especially doors. The resulting passage-free floor image $\hat{E}(i)$ describes the individual rooms and corridors of a floor and therefore contains a definition of which objects are rooms and which are not.

The corrected floor image $\underline{E}(i)$ is segmented with the help of the continuity-free floor image $\hat{E}(i)$. During segmentation, in each map pixel in $\underline{E}(i)$, the class from the continuity-free floor image $\hat{E}(i)$ is assigned which has the shortest distance to the area in E(i) with this pixel. If an area in Ê(i) has no connection to a classified object, the area is discarded.

In one implementation, the watershed algorithm is used in the step of segmenting the corrected floor image E(i). This algorithm is described in F. Meyer: "Color image segmentation", Proceed. International Conference on Image Processing and its Applications, pp. 303-306, IET, 1992.

A classified object in Ê(i) is either a rectangular room or some other surface, in particular a corridor. The area of this object is calculated as the area of the convex hull or the smallest rectangular hull. An object is a miscellaneous surface, i.e. not a rectangular space, if an exception condition is met. The exception condition is met if the ratio of length to width or the ratio of the area of the convex hull to the area of the object is greater than a threshold.

Figure 13:
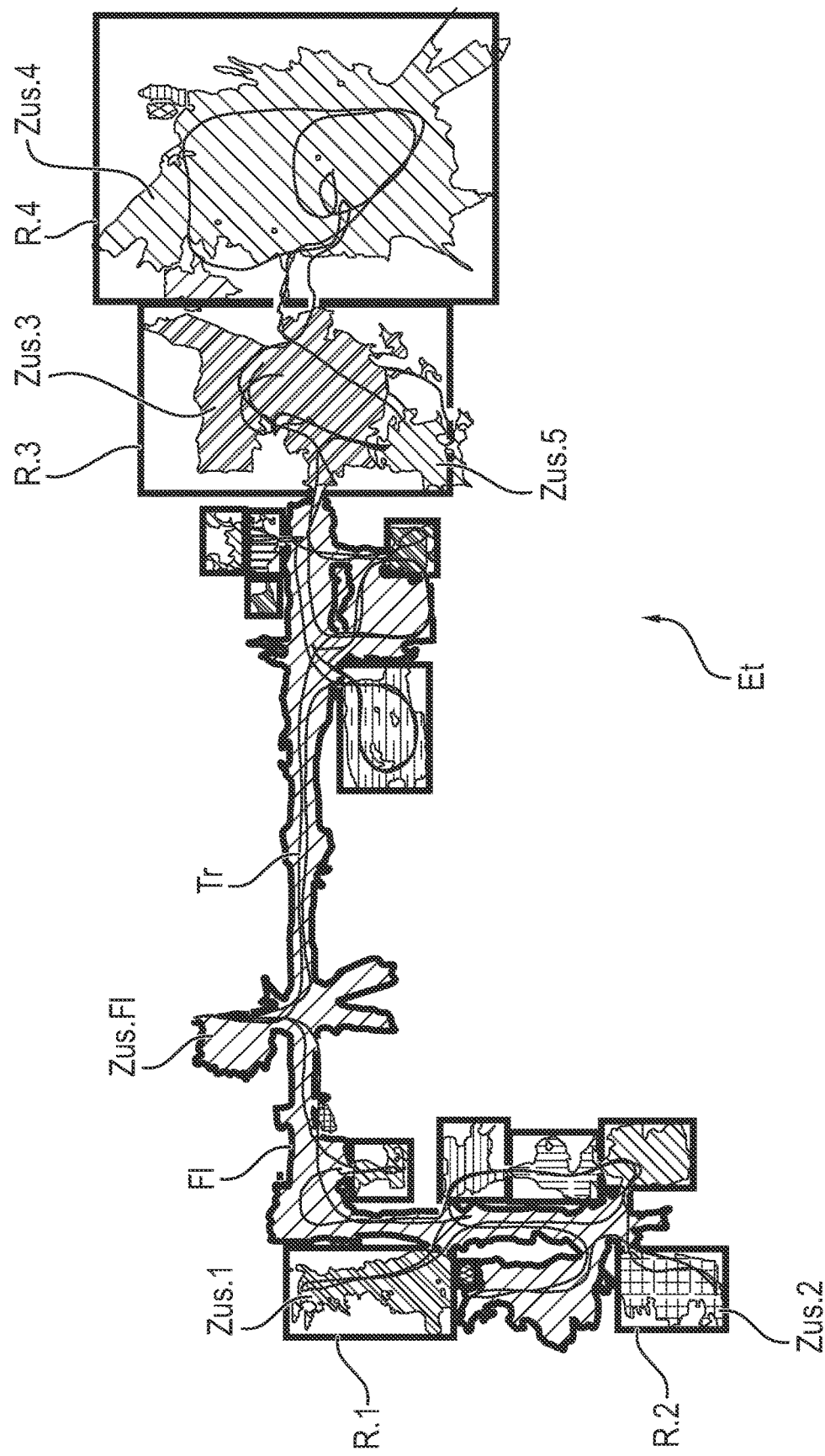
FIG. 13 is a view showing the actual motion path of FIG. 8, the recognized contiguous areas of floor segments, and the floor plan of FIG. 1.

FIG. 13 shows how rectangular rooms and other areas of the floor plan, especially corridors, are detected. The presentation of FIG. 13 is obtained from the presentation of FIG. 12. Around each contiguous area Zus.1, Zus.2, ... of floor segments a rectangle is placed in each case, if the above-mentioned exception condition is not fulfilled. The exception condition is fulfilled for the connected area Zus.Fl, which is actually located in a corridor and not in a rectangular space. In the example of FIG. 13, the floor plan of FIG. 1 is not shown. Also not shown are the trajectory Tr of FIG. 8 and the recognized floor segments. Also shown are those rooms that were recognized under the assumption that rooms have a rectangular floor area.

The generated floor plan is displayed, for example, on a display unit of a firefighter, in particular on the display unit An of the firefighter Fw.

While specific embodiments of the invention have been shown and described in detail to illustrate the application of the principles of the invention, it will be understood that the invention may be embodied otherwise without departing from such principles.

| | List of reference characters |
|---|---|
| α | Angle between the reference axis Ref and a line between the receiver of the communication unit Komm and the transmitter UWB. 1 |
| To An | Display unit attached to the protective helmet Hm of the firefighter Fw. |
| B | Entirety of the detected floor segments |
| B.1, | Detected floor segment |
| B.x, B.y, B.z | Segment that is not classified as a floor segment because it is too small |
| Bf | Cone-shaped field of view of the infrared camera IR |
| BLE | Bluetooth Low Energy |
| Br | Direction of view of the infrared camera IR, center axis of the field of view Bf |
| dist | Distance (spacing) between the receiver of the communication unit Komm and the transmitter UWB. 1 |
| D.1 | Dilatation of the bottom segment B.1 |
| Dr.1 | Vertical drift of the initial trajectory Tr.1 |
| Dr.2 | Vertical drift of the intermediate trajectory Tr.2 |
| E(i) | Floor image, generated from the grid (grid map) |
| Ē(i) | Corrected floor image, generated from floor image E(i) |
| Ē(i) | Floor pattern without passage |
| Et | Floor from which a floor plan is created |
| Fl | Hallway in floor plan |
| Fw | Firefighter carrying the protective helmet Hm and the mobile sensor arrangement comprising the infrared camera IR, the inertial sensor unit IMU and the UWB communication unit Komm as well as the display unit An |
| Fw.1, Fw.2, ... | Other firefighters, each wear a protective helmet Hm.1, Hm.2, ... and a transmitter UWB.1, UWB.2, UWB.3 |
| Hm | Protective helmet of the firefighter Fw, to which the infrared camera IR, the inertial sensor unit IMU, the camera Ka and the receiver of the communication unit Komm are attached. |

-continued

| | List of reference characters |
|---|---|
| Hm.1, Hm.2, ... | Protective helmets of the other firefighters Fw.1, Fw.2, ... |
| IR | Infrared camera (thermal imaging camera) of the firefighter Fw, generates infrared images, attached to the protective helmet Hm |
| IMU | Inertial sensor unit of the firefighter Fw, measures three linear accelerations and three angular accelerations, generates an orientation signal and a motion signal, attached to the protective helmet Hm |
| Ka | Camera, attached to the protective helmet Hm of the firefighter Fw, is used to determine the position of the communication unit Komm relative to the protective helmet Hm |
| Kl | Classifier, in the embodiment a component of the signal processing unit Sv |
| Komm | Communication unit, carried by the firefighter Fw, capable of determining, according to Ultra Wideband (UWB) or Bluetooth Low Energy (BLE), the respective distance between itself and a transmitter UWB.1, UWB.2, ... and the direction from which a transmitter UWB.1, UWB.2, ... emits radio waves, is attached to the carrying plate Pl of the compressed air breathing apparatus |
| L.1, L.2 | Gaps in the whole B |
| Obj | Object in space R.x, has a distance to the wall W |
| Pl | Carrying plate carrying a compressed air breathing apparatus (SCBA) and, in one embodiment, the communication unit Komm and the signal processing unit Sv |
| Pos.1, Pos.2, ... | Pose representing the current position and orientation of the infrared camera IR. |
| R.1, R.2, ... | Rectangles placed around the surfaces Zus. 1, Zus.2, ... describe rectangular spaces |
| R.x | Room with the wall W |
| Ref | Reference axis of the mobile sensor arrangement, parallel to or equal to the viewing direction Br |
| Rett | Human to be rescued |
| Sv | Signal processing unit, attached to the helmet Hm |
| Tr | Trajectory--actual motion path of the camera IR through the floor |
| Tr.1 | Initial trajectory |
| Tr.2 | Intermediate trajectory |
| Tr.3 | Final trajectory, is used as an approximation for the actual motion path Tr |

What is claimed is:

1. An image evaluation process comprising the steps of: providing an image evaluation system, which comprises a mobile sensor arrangement, a signal processing unit with a classifier and a transmitter group with at least one transmitter; wherein the mobile sensor arrangement comprises a camera, a motion sensor, and a receiver;

at least temporarily connecting each person of a group of persons to a respective transmitter of the group of transmitters, wherein the or each transmitter of the transmitter group is configured to generate and radiate a signal by radio waves, and wherein the receiver is configured to receive a respective signal from the or each transmitter of the transmitter group;

moving the mobile sensor arrangement through a spatial area;

with the camera, generating an image sequence of images as the camera is moved through the spatial area;

with the motion sensor, generating an orientation signal which describes a respective viewing direction of the camera in a predefined three-dimensional coordinate system, when generating an image of the image sequence with the camera;

with the signal processing unit, repeatedly checking whether the receiver is currently receiving a signal from a transmitter of the transmitter group;

with the signal processing unit, upon the receiver receiving a signal from a transmitter, determining an indicator for the current distance between the transmitter sending the signal and the receiver;

with the classifier, at least in response to the receiver receiving a signal from a transmitter, searching for each picture of a human shown in at least one image of the sequence of images, the image generated by the camera during reception of the signal; and with the signal processing unit, deciding whether a picture of a human detected by the classifier shows a person associated with a transmitter of the transmitter group or shows another human;

wherein this decision is made based on the orientation signal and based on the distance between the transmitter and the receiver determined upon the receiver receiving a signal from a transmitter at the time when the picture of the human detected by the classifier was generated.

2. A process according to claim 1,
wherein the process further comprises the additional steps of:
with the motion sensor, generating a motion signal describing movements of the camera in the three-dimensional coordinate system,
with the signal processing unit, determining a three-dimensional trajectory which describes in the three-dimensional coordinate system an actual motion path of the camera through the spatial area,
wherein for determining the three-dimensional trajectory, the signal processing unit uses the motion signal and the orientation signal as well as images of the image sequence and pictures of humans detected by the classifier in images of the image sequence.

3. A process according to claim 2, further comprising the step of:
with the signal processing unit, determining key segments,
wherein key segments are segments of the spatial area which are recognizable in at least two different images of the camera and which do not move relative to the spatial area, wherein the signal processing unit, in determining key segments, excludes image areas of the images which at least partially show a picture of a human, and
wherein the signal processing unit determines the three-dimensional trajectory further based on the determined key segments.

4. A process according to claim 3, wherein the process comprises the steps of:
with the signal processing unit, determining an initial trajectory based at least on the determined key segments and on the motion signal;
with the signal processing unit, determining those key segments which are shown in at least two non-consecutive images of the image sequence, wherein a key segment is shown in at least two non-consecutive images if there is at least one image between these two images without the key segment;
with the signal processing unit, determining from the initial trajectory a three-dimensional corrected trajectory based on the determined key segments shown in non-consecutive images;

wherein each subarea of the spatial area in which the camera has generated at least twice at least one image and has generated in between at least one image in another subarea in each case results in a corrected trajectory section in the corrected trajectory and wherein the distance between two corrected trajectory sections is less than or equal to the distance between the corresponding initial trajectory sections;

with the signal processing unit using an assumption that a floor surface of the spatial area is consists of horizontal areas, computationally eliminating a possible vertical drift in the corrected trajectory;

with the signal processing unit, deciding for each section of the corrected trajectory having a vertical extent whether this section comprises a change between two different horizontal subareas of the spatial area or extends in the same subarea;

with the signal processing unit, generating a three-dimensional final camera trajectory by eliminating the vertical drift; and using the three-dimensional final camera trajectory as the three-dimensional trajectory describing the motion path of the camera through the spatial area.

5. A process according to claim 2, further comprising the steps of:
with the signal processing unit, determining in each image of the image sequence contiguous horizontal area segments, wherein segments of the images are excluded which each show a picture of a human;
with the signal processing unit, determining contiguous floor segments based on the determined contiguous horizontal area segments; and
with the signal processing unit, determining a floor plan of the spatial area based on the determined three-dimensional trajectory and the determined contiguous floor segments.

6. A process according to claim 1, wherein the camera generates all images or at least a part of the images of the image sequence in a wavelength range above 3 μm when being moved through the area.

7. A process according to claim 1, wherein the camera generates all images or at least a part of the images of the image sequence in a wavelength range above 7 μm when being moved through the area.

8. A process according to claim 1, wherein the event that the receiver has received a signal from a transmitter of the transmitter group triggers the step of: with the classifier, searching for a picture of a human in at least one image of the sequence of images wherein said image having been generated in a period of time in which the receiver has received the signal.

9. A process according to claim 1, wherein
upon the receiver receiving a signal from a transmitter, with the signal processing unit, additionally determining a direction from which the receiver receives the signal;
with the signal processing unit, deciding whether a picture of a human in an image of the image sequence shows a person connected to a transmitter of the transmitter group, the decision is additionally based on the determined direction; and
with the signal processing unit, comparing the viewing direction of the camera when generating the image with the determined direction from which the receiver receives the signal and using the result of the comparison for the determination whether a detected picture shows a person associated with a transmitter.

10. A process according to claim 1, wherein:
with the motion sensor, generating a motion signal describing movements of the camera in the three-dimensional coordinate system;
with the signal processing unit, when a picture of a human is detected, determining a respective current position in the three-dimensional coordinate system of the human whose picture was detected by the classifier;
wherein the signal processing unit uses for determining the human's current position the motion signal, the orientation signal, and the image or an image of the image sequence, the used image comprising the picture of the human.

11. A process according to claim 1, wherein the process further comprises the additional steps of:
measuring the distance between the camera and the receiver; and
with the signal processing unit, deciding whether a picture of a human shows a person connected to a transmitter or shows another human further based on the measured distance between the camera and the receiver.

12. A process according to claim 1, wherein:
the mobile sensor arrangement is attached to a protective equipment of a person; and
the person with the protective equipment moves through the spatial area and thereby moves the mobile sensor arrangement through the spatial area.

13. A process according to claim 1, further comprising the steps of connecting another transmitter of the transmitter group to a human in the spatial area after the classifier has identified a picture of said human in at least one image of the camera.

14. A process according to claim 1, wherein the signal processing unit, at least when the classifier has recognized at least one picture of a human in an image of the sequence of images, controls a display unit
such that the display unit visually perceptibly displays said image of the sequence of images with said at least one picture of a human shown highlighted relative from the rest of said image of the sequence of images in a first way, if said picture in the image of the sequence of images shows a person of the group of persons, and the picture of the human otherwise highlighted in a second way different from the first way.

15. A process according to claim 14, wherein the display unit is a part of the mobile sensor arrangement and is moved through the spatial area.

16. An image evaluation system comprising:
a mobile sensor arrangement, the mobile sensor arrangement comprising: a camera, a motion sensor, and a receiver; wherein the mobile sensor arrangement is configured to be moved through a spatial area and the camera is configured to generate a sequence of images as the camera is moved through the spatial area and wherein the motion sensor is configured to generate an orientation signal that describes a respective viewing direction of the camera in a predefined three-dimensional coordinate system when the camera generating an image of the sequence of images;
a transmitter group comprising at least one transmitter, wherein the or each transmitter of the transmitter group is configured to be connected to a respective person of a group of persons, wherein the or each transmitter of the transmitter group is configured to generate and radiate a signal by radio waves, wherein the receiver is configured to receive a respective signal from the or each transmitter of the transmitter group; and
a signal processing unit with a classifier, wherein the signal processing unit is configured to:
check whether the receiver receives a signal from a transmitter of the transmitter group; and
upon the receiver having received a signal from a transmitter of the transmitter group, determine an indicator for the distance between the transmitter sending the signal and the receiver,
wherein the classifier is configured to:
search in an image of the sequence of images for each picture of a human shown in the image;
perform the search for a picture at least in response to the receiver receiving a signal from a transmitter; and
perform the search at least one in an image of the sequence of images wherein the image is generated by the camera during the reception of the signal;
wherein the signal processing unit is configured to:
decide whether a picture of a human detected by the classifier in an image shows a person associated with a transmitter of the transmitter group or another human wherein this decision is made based on the orientation signal and if the receiver receives a signal from a transmitter at the time the picture of a person of the group of persons is generated based on the determined distance between this transmitter and the receiver.

17. An image evaluation system according to claim 16, wherein
the motion sensor is configured to generate a motion signal,
the motion signal describes movements of the camera in the predefined three-dimensional coordinate system; and
the signal processing unit is further configured to:
determine a trajectory describing an actual motion path of the camera through the spatial area; and
determine the trajectory using the motion signal and the orientation signal as well as images of the image sequence and pictures of humans, which the classifier has recognized in images of the image sequence.

18. An image evaluation system according to claim 16, wherein the mobile sensor arrangement is attached or attachable to a protective equipment of a person and is configured so that the mobile sensor arrangement is moved through the spatial area upon the person with the protective equipment and the mobile sensor arrangement attached to the protective equipment moving through the spatial area.

19. An image evaluation system according to claim 16, wherein
the image evaluation system additionally comprises a display unit; and
the signal processing unit is configured to
at least if the classifier has recognized at least one picture of a human in an image of the sequence of images
control the display unit such that the display unit visually perceptibly displays the image with the at least one picture of the human highlighted from the rest of the image in a first way, if the picture shows a person of the group of persons, and the picture of the human otherwise highlighted in a second way different from the first way.

* * * * *